(12) United States Patent
Paradowski et al.

(10) Patent No.: US 9,506,690 B2
(45) Date of Patent: Nov. 29, 2016

(54) PROCESS FOR THE PRODUCTION OF A SUBCOOLED LIQUEFIED NATURAL GAS STREAM FROM A NATURAL GAS FEED STREAM, AND ASSOCIATED INSTALLATION

(75) Inventors: Henri Paradowski, Pluvigner (FR); Sylvain Vovard, Courbevoie (FR)

(73) Assignee: TECHNIP FRANCE (FR)

( * ) Notice: Subject to any disclaimer, the term of this patent is extended or adjusted under 35 U.S.C. 154(b) by 1634 days.

(21) Appl. No.: 12/624,587

(22) Filed: Nov. 24, 2009

(65) Prior Publication Data

US 2010/0126214 A1 May 27, 2010

(30) Foreign Application Priority Data

Nov. 25, 2008 (FR) ...................................... 08 57996

(51) Int. Cl.
*F25J 1/02* (2006.01)
*F25J 1/00* (2006.01)

(52) U.S. Cl.
CPC ............... *F25J 1/0092* (2013.01); *F25J 1/005* (2013.01); *F25J 1/0022* (2013.01); *F25J 1/0035* (2013.01); *F25J 1/0057* (2013.01); *F25J 1/0072* (2013.01); *F25J 1/0082* (2013.01); *F25J 1/0097* (2013.01); *F25J 1/0204* (2013.01); *F25J 1/025* (2013.01); *F25J 1/0207* (2013.01); *F25J 1/0215* (2013.01); *F25J 1/0217* (2013.01); *F25J 1/0218* (2013.01); *F25J 1/0263* (2013.01); *F25J 1/0265* (2013.01); *F25J 1/0278* (2013.01); *F25J 1/0288* (2013.01); *F25J 1/0294* (2013.01); *F25J 2210/06* (2013.01); *F25J 2240/40* (2013.01); *F25J 2240/70* (2013.01); *F25J 2270/16* (2013.01); *F25J 2290/44* (2013.01)

(58) Field of Classification Search
CPC ...... F25J 1/0207; F25J 1/0072; F25J 1/0022; F25J 1/005; F25J 1/0025; F25J 1/0035; F25J 1/00201–1/0218; F25J 1/0227; F25J 2270/42; F25J 2270/06; F25J 2270/14; F25J 2270/16; F25B 11/00; F25B 9/06
USPC ................................... 62/611, 612, 613, 614
See application file for complete search history.

(56) References Cited

U.S. PATENT DOCUMENTS

| | | | |
|---|---|---|---|
| 3,581,510 A * | 6/1971 | Hughes ........................... | 62/612 |
| 5,141,705 A * | 8/1992 | Stenvall et al. ........... | 420/584.1 |
| 5,768,912 A | 6/1998 | Dubar ............................. | 62/613 |

(Continued)

*Primary Examiner* — Frantz Jules
*Assistant Examiner* — Brian King
(74) *Attorney, Agent, or Firm* — Ostrolenk Faber LLP

(57) ABSTRACT

A process for the production of a subcooled liquefied natural gas stream from a natural gas feed stream. Passing a first natural gas feed stream through a first heat exchanger for precooling by heat exchange with a first stream of gaseous refrigerant produced in a first refrigeration cycle comprising a first dynamic expansion turbine. Passing the precooled feed stream through a second heat exchanger for liquefying by heat exchange with a second stream of gaseous refrigerant produced in a second refrigeration cycle comprising a second dynamic expansion turbine. Passing the liquefied natural gas stream through a third heat exchanger for subcooling the liquefied gas by heat exchange with a third refrigerant stream produced in a third refrigeration cycle comprising a third dynamic expansion turbine separate from the first turbine and the second turbine. An installation includes devices for conveying the natural gas stream, the heat exchangers and the turbines and compression devices cooling the refrigerants for the heat exchangers.

21 Claims, 9 Drawing Sheets

(56) References Cited

U.S. PATENT DOCUMENTS

| | | | |
|---|---|---|---|
| 2003/0089125 A1* | 5/2003 | Fredheim | F25J 1/0022 62/612 |
| 2004/0109798 A1* | 6/2004 | Chopard et al. | 422/198 |
| 2007/0157663 A1* | 7/2007 | Mak | F25J 1/0022 62/620 |
| 2008/0141711 A1* | 6/2008 | Roberts et al. | 62/611 |
| 2009/0217701 A1* | 9/2009 | Minta | F25J 1/0022 62/612 |

* cited by examiner

PROCESS FOR THE PRODUCTION OF A SUBCOOLED LIQUEFIED NATURAL GAS STREAM FROM A NATURAL GAS FEED STREAM, AND ASSOCIATED INSTALLATION

BACKGROUND OF THE INVENTION

The present invention relates to a process for the production of a subcooled liquefied natural gas stream from a natural gas feed stream, the process being intended to form liquefied natural gas (LNG) subcooled to a temperature below −120° C.

Such a process is to be carried out especially in the vicinity of natural gas production sites in order to convert a natural gas feed of large volume into a liquefied natural gas of reduced volume. The LNG can especially be loaded into methane tankers in order to be transported by sea to consumption centres.

The process is to be carried out either in new natural gas liquefaction units or in existing units.

For the liquefaction of a natural gas feed, a process comprising a plurality of refrigeration cycles using refrigerant fluids formed by $C_2^+$ hydrocarbons is frequently used.

An example of such a process, denoted by the acronym "C3/MR", uses two refrigeration cycles, a first cycle that uses propane and a second cycle in which a mixture of refrigerants composed of nitrogen, methane, ethane and propane is used.

The refrigerants circulating in these cycles are at least partly liquefied after compression in gas form, for example by undergoing static expansion in an expansion valve.

The liquid so obtained is placed in a heat exchange relationship with the feed at different temperature levels. The liquid refrigerant evaporates by heat exchange with the feed, thus supplying frigories for the cooling, liquefaction and subcooling of the feed. These refrigeration cycles can be adapted thermodynamically to the feed in order to obtain very high efficiencies.

However, such processes require refrigerants to be used and stored in liquid form, both inside and outside the liquefaction unit. Accordingly, hydrocarbons such as propane and ethane must be produced or supplied in liquid form and stored at least temporarily. This requires particular precautions in terms of safety and an infrastructure adapted to avoid accidents.

Such processes are therefore not suitable for environments having a small available space and/or safety constraints, such as especially the floating units for the recovery, storage and treatment of hydrocarbons designated by the acronym "FPSO" or platforms located at sea directly above submarine natural gas fields.

Accordingly, it is necessary in the latter two cases to convey the natural gas to a liquefaction unit located on land, which is not very economical and requires the laying of a submarine pipeline.

In order to remedy that problem, there is known from U.S. Pat. No. 5,768,912 a process of the above-mentioned type which employs, for precooling and liquefying the natural gas, a first cycle using a conventional mixed refrigerant followed by a second complex cycle comprising three dynamic gas expansion turbines.

In the second cycle, the refrigerant fluid is formed substantially of nitrogen, which remains gaseous for the entire time for which it circulates in the cycle.

Such a process therefore makes it possible to overcome some of the difficulties associated with the transport, storage and use of dangerous liquid refrigerant fluids formed by $C_2^+$ hydrocarbons. In addition, it is relatively insensitive to the movements of the unit in which it is carried out, especially when that unit is on board a floating system.

Nevertheless, that process exhibits a low thermodynamic efficiency, which renders its use expensive in terms of energy.

SUMMARY OF THE INVENTION

An object of the invention is, therefore, to precool, liquefy and subcool a natural gas feed in a reliable manner and in a limited space which is potentially floating on an expanse of water, while being very economical.

To that end, the invention relates to a process of the above-mentioned type, characterized in that it comprises the following steps:

precooling the natural gas feed stream by passing it through a first heat exchanger in order to obtain a feed stream precooled to a temperature below −20° C.;

liquefying the precooled feed stream by passing it through a second heat exchanger in order to obtain at least one liquefied natural gas stream at a temperature below −80° C.;

subcooling the liquefied natural gas stream by passing it through a third heat exchanger in order to obtain a liquefied natural gas stream subcooled to a temperature below −120° C.;

placing the feed stream in a heat exchange relationship in the first heat exchanger with a first stream of substantially gaseous refrigerant produced in a first refrigeration cycle from a first gaseous stream of expanded refrigerant fluid issuing from a first dynamic expansion turbine;

placing the precooled feed stream in a heat exchange relationship in the second heat exchanger with a second stream of gaseous refrigerant circulating in a second refrigeration cycle, the second gaseous refrigerant stream being produced from a second gaseous stream of expanded fluid coming from a second dynamic expansion turbine separate from the first dynamic expansion turbine;

placing the liquefied natural gas stream in a heat exchange relationship in the third heat exchanger with a third refrigerant stream circulating in a third refrigeration cycle, the third refrigerant stream being produced at least partly from a third gaseous stream of expanded fluid issuing from a third dynamic expansion turbine separate from the first dynamic expansion turbine and the second dynamic expansion turbine;

conveying the first stream of heated refrigerant obtained at the outlet of the first heat exchanger to a first compression device without passing through the second heat exchanger and without passing through the third heat exchanger;

conveying the second stream of heated refrigerant issuing from the second heat exchanger to a second compression device without passing through the first heat exchanger and without passing through the third heat exchanger;

conveying the third stream of heated refrigerant issuing from the third heat exchanger to a third compression device without passing through the first heat exchanger and without passing through the second heat exchanger.

The process according to the invention can comprise one or more of the following features, taken in isolation or in any technically possible combination(s):

it comprises the following steps:

separating the first gaseous stream of expanded refrigerant fluid into the first gaseous refrigerant stream and a first auxiliary cooling stream;

placing the first auxiliary cooling stream in a heat exchange relationship in a second cycle exchanger with a second compressed refrigerant stream issuing from the second compression device in order to form a second cooled compressed refrigerant stream, conveying the second cooled compressed refrigerant stream to the second expansion turbine in order to form the second gaseous stream of expanded refrigerant fluid;

it comprises the following steps:

separating the second gaseous stream of expanded refrigerant fluid into the second gaseous refrigerant stream and a second auxiliary cooling stream, and placing the second auxiliary cooling stream in a heat exchange relationship in a third cycle exchanger with a third stream of compressed refrigerant issuing from the third compression device in order to form a third cooled compressed refrigerant stream, conveying the third cooled compressed refrigerant stream to the third expansion turbine in order to form the third gaseous stream of expanded refrigerant fluid;

the refrigerant fluids circulating in the first refrigeration cycle, in the second refrigeration cycle and in the third refrigeration cycle are completely separate, the first heated refrigerant stream issuing from the first heat exchanger, the second heated refrigerant stream issuing from the second heat exchanger, and the third heated refrigerant stream issuing from the third heat exchanger being conveyed to separate compressors of the first compression device, of the second compression device and of the third compression device, respectively, in order to be compressed separately from one another;

it comprises the following steps:

forming at least one mixed stream from at least two of the first heated refrigerant stream, the second heated refrigerant stream and the third heated refrigerant stream, compressing the or each mixed stream in a compressor common to at least two of the first compression device, the second compression device and the third compression device;

the third refrigerant stream is substantially gaseous before being introduced into the third heat exchanger;

it comprises the following steps:

separating the compressed refrigerant stream issuing from the third compression device into a stream for forming the third refrigerant stream and a gaseous stream for refrigeration of the forming stream, conveying the gaseous cooling stream to the third expansion turbine, and placing the expanded gaseous cooling stream issuing from the third expansion turbine in a heat exchange relationship with the forming stream in order to liquefy the forming stream, conveying the liquefied forming stream to a hydraulic expansion turbine in order to form the third refrigerant stream in substantially liquid form, placing the third refrigerant stream in substantially liquid form in a heat exchange relationship with the liquefied natural gas stream in the third heat exchanger;

it comprises the following steps:

dividing the precooled feed stream issuing from the first heat exchanger into a main precooled feed stream and an auxiliary expansion stream, expanding the auxiliary expansion stream to a low pressure that is at least 5 bar below the pressure of the main stream, and passing a stream derived from the expansion stream through the second heat exchanger and through the third heat exchanger, in succession, in order to deliver a stream of subcooled liquefied natural gas at low pressure;

the molar nitrogen content of each of the first refrigerant stream, the second refrigerant stream and the third refrigerant stream is greater than 90%;

the first refrigerant stream is based on natural gas having a molar methane content greater than 70%;

the second refrigerant stream has a molar methane content greater than 90%;

the first refrigerant stream (60) has a molar carbon dioxide content greater than 5%; and the pressure at the outlet of the first compression device is greater than 50 bar, advantageously greater than 70 bar, and the pressure at the inlet of the first compression device is greater than 10 bar, advantageously greater than 15 bar.

The invention relates also to an installation for the production of a subcooled liquefied natural gas stream from a natural gas feed stream, characterized in that it comprises:

means for precooling the natural gas feed stream, comprising a first heat exchanger for obtaining a feed stream precooled to a temperature below −20° C.;

means for liquefying the precooled feed stream, comprising a second heat exchanger for obtaining at least one liquefied natural gas stream at a temperature below −80° C.;

means for subcooling the liquefied natural gas stream, comprising a third heat exchanger for obtaining a liquefied natural gas stream subcooled to a temperature below −120° C.;

a first refrigeration cycle comprising a first dynamic expansion turbine and a first compression device, the feed stream being placed in a heat exchange relationship in the first heat exchanger with a first stream of substantially gaseous refrigerant produced in the first refrigeration cycle from a first gaseous stream of expanded refrigerant fluid issuing from the first dynamic expansion turbine;

a second refrigeration cycle comprising a second dynamic expansion turbine, separate from the first dynamic expansion turbine, and a second compression device, the precooled feed stream being placed in a heat exchange relationship in the second heat exchanger with a second stream of gaseous refrigerant produced from a second gaseous stream of expanded refrigerant fluid coming from the second dynamic expansion turbine;

a third refrigeration cycle comprising a third dynamic expansion turbine, separate from the first dynamic expansion turbine and the second dynamic expansion turbine, and a third compression device, the liquefied natural gas stream being placed in a heat exchange relationship in the third heat exchanger with a third refrigerant stream circulating in the third refrigeration cycle, the third refrigerant stream being produced at least partly from a third gaseous stream of expanded fluid issuing from the third dynamic expansion turbine;

the first refrigeration cycle comprising means for conveying the first heated refrigerant stream obtained at the outlet of the first heat exchanger to the first compression device without passing through the second heat exchanger and without passing through the third heat exchanger;

the second refrigeration cycle comprising means for conveying the second heated refrigerant stream obtained at the outlet of the second heat exchanger to the second compression device without passing through the first heat exchanger and without passing through the third heat exchanger;

the third refrigeration cycle comprising means for conveying the third heated refrigerant stream issuing from the third heat exchanger to the third compression device without passing through the first heat exchanger and without passing through the second heat exchanger;

the first heat exchanger, the second heat exchanger and the third heat exchanger are tube and calender exchangers of the conventional or coiled type;

the first heat exchanger, the second heat exchanger and the third heat exchanger are made of austenitic stainless steel; and the first heat exchanger, the second heat exchanger and the third heat exchanger are tube and calender exchangers of the conventional type.

The invention will be better understood upon reading the following description, which is given solely by way of example and with reference to the accompanying drawings, in which:

DESCRIPTION OF PREFERRED EMBODIMENTS

Figure 1:
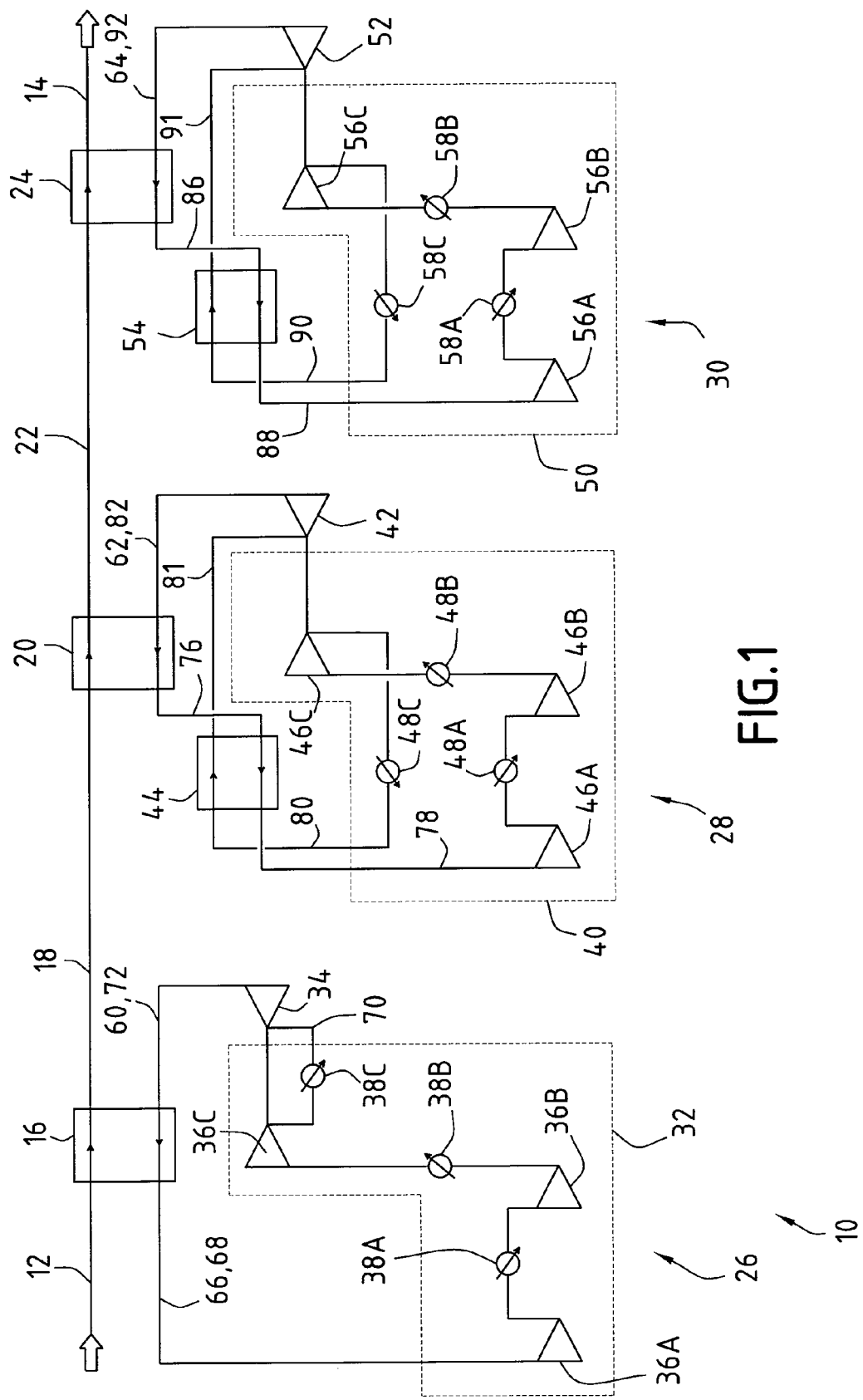
FIG. 1 is a schematic diagram of a first installation for carrying out a first production process according to the invention.

FIG. 1 shows a first installation 10 according to the invention for liquefying and subcooling a stream 12 of a feed of natural gas obtained in gaseous form, in order to form a stream 14 of subcooled liquefied natural gas (LNG).

The installation 10 comprises a first heat exchanger 16 for precooling the feed stream 12 to form a precooled feed stream 18, a second heat exchanger 20 for liquefying the precooled feed stream 18 to form a liquefied natural gas stream 22, and a third heat exchanger 24 for subcooling the liquefied natural gas stream and forming the subcooled LNG stream 14.

The installation 10 further comprises a first refrigeration cycle 26 for supplying the first heat exchanger 16, a second refrigeration cycle 28 for supplying the second heat exchanger 20, and a third refrigeration cycle 30 for supplying the third heat exchanger 24.

The refrigeration cycles 26, 28, 30 are cycles of the "reverse Brayton" type, each operating with a substantially gaseous refrigerant fluid which undergoes dynamic expansion.

Accordingly, the first refrigeration cycle 26 comprises a first compression device 32 and a first dynamic expansion turbine 34.

The first compression device 32 comprises, in this example, a plurality of compression stages, each stage comprising a compressor 36A, 36B, 36C and a cooler 38A, 38B, 38C mounted in series at the outlet of a compressor 36A, 36B, 36C.

The last compressor 36C of the first device 32 is coupled for rotation with the first turbine 34 so as to be driven in rotation preferably mainly by the turbine 34. The compressors 36A, 36B are preferably driven in rotation by a common motor.

The second refrigeration cycle 28 comprises a second compression device 40 and a second dynamic expansion turbine 42, which is separate from the first turbine 34. It further comprises a second cycle exchanger 44.

The second compression device 40 has a structure analogous to that of the first compression device 32. Accordingly, in this example, it has a plurality of compression stages, each stage comprising a compressor 46A, 46B, 46C and a cooler 48A, 48B, 48C mounted in series at the outlet of a compressor 46A, 46B, 46C.

The last compressor 46C of the second device 40 is coupled for rotation with the second turbine 42 so as to be driven in rotation preferably mainly by the turbine 42. The compressors 46A, 46B are preferably driven in rotation by a common motor.

The third refrigeration cycle 30 comprises a third compression device 50, a third expansion turbine 52 and a third cycle exchanger 54.

The third compression device 50 has a structure analogous to that of the first compression device 32. Accordingly, in this example, it has a plurality of compression stages, each stage comprising a compressor 56A, 56B, 56C and a cooler 58A, 58B, 58C mounted in series at the outlet of a compressor 56A, 56B, 56C.

The last compressor 56C of the third device 50 is coupled for rotation with the third turbine 52 so as to be driven in rotation preferably mainly by the turbine 52. The compressors 56A, 56B are preferably driven in rotation by a common motor.

In the example shown in FIG. 1, the three refrigeration cycles 26, 28, 30 are completely separate. They operate with a first refrigerant fluid, a second refrigerant fluid and a third refrigerant fluid, respectively, without mixing or heat exchange between the fluids.

The compressors of the first compression device 26, of the second compression device 28 and of the third compression device 30 are all separate.

A first liquefaction and subcooling process according to the invention will now be described.

In the following, a stream of fluid and the pipe carrying it will be denoted by the same reference numeral. Likewise, pressures are absolute pressures and, unless indicated otherwise, percentages are molar percentages.

The efficiency of each compressor in this example is 82% polytropic and the efficiency of each turbine is 86% adiabatic.

In this example, the feed stream 12 is a stream of natural gas comprising 4.00 mol % nitrogen, 87.50 mol % methane, 5.50 mol % ethane, 2.10 mol % propane, 0.30 mol % i-$C_4$ hydrocarbon, 0.50 mol % n-$C_4$ hydrocarbon and 0.10 mol % i-$C_5$ hydrocarbon. Accordingly, the stream 12 has a molar hydrocarbon content greater than 80% and a molar nitrogen content of from 0% to 20%.

The feed stream has a temperature below 50° C., for example from 50° C. to 0° C., in this example 35° C. It has a pressure greater than 30 bar, especially from 30 bar to 90 bar, advantageously 66.5 bar.

In this example, the feed stream 12 is solely gaseous. It has a liquid fraction of less than 0.1% by mass.

The molar flow rate of feed to be treated is greater than 20 kmoles/h in this example and is advantageously 40,000 kmoles/h.

The feed stream 12 is introduced into the first heat exchanger 16, where it is precooled to a temperature below −20° C., especially to a temperature of −40° C., by heat exchange with a first stream 60 of refrigerant formed by the first refrigerant fluid circulating in the first refrigeration cycle 26.

At the outlet of the first heat exchanger 16, the stream 12 forms the precooled feed stream 18. The feed stream 18 is substantially gaseous, so that it has a volume fraction of liquid of less than 5%.

The precooled feed stream 18 is then introduced into the second heat exchanger 20, where it is condensed countercurrently with a second stream 62 of gaseous refrigerant formed by the second refrigerant fluid circulating in the second refrigeration cycle 28.

At the outlet of the second heat exchanger 20, the stream 18 forms the LNG stream 22, which has a temperature below −80° C., especially a temperature substantially equal to −90° C.

The LNG stream 22 is then introduced into the third heat exchanger 24, where it is placed in a counter-current heat exchange relationship with a third stream 64 of gaseous refrigerant formed by the third refrigerant fluid circulating in the third cycle 30.

At the outlet of the third heat exchanger 24, the stream 22 forms the subcooled LNG stream 14, which is produced at a temperature below −120° C., especially at a temperature equal to −148.1° C.

The subcooled LNG stream 14 also has a pressure slightly below the pressure of the feed stream 12, for example 10% below the pressure of the feed stream 12 and, in this example, equal to 62 bar.

In the example shown in FIG. 1, the first refrigeration cycle 26 is a closed cycle of the reverse Brayton type.

In that cycle, the first stream 66 of heated refrigerant issuing from the first heat exchanger 16 forms the totality of a first stream 68 of heated refrigerant fluid at low pressure, which is injected at an inlet of the first compressor 36A of the compression device 32.

The first stream of heated refrigerant 66 is conveyed to the first compression device 32 without passing through either the second heat exchanger 20 or the third heat exchanger 24. It is not placed in a heat exchange relationship again with the natural gas feed between the outlet of the first exchanger 16 and the inlet of the first compression device 32.

The first low-pressure stream 68 is compressed in each compressor 36A, 36B, 36C in succession while being cooled at the outlet of each compressor 36A, 36B, 36C by a cooler 38A, 38B, 38C.

The refrigerant is based on water or on air available in the installation 10. Accordingly, it has a temperature of, for example, from 0° C. to 40° C.

At the outlet of the first compression device 26, the stream 68 forms a first stream 70 of compressed refrigerant, which has a pressure greater than 60 bar and especially substantially equal to 75 bar. The stream 70 has a temperature substantially equal to that of the coolers 38A, 38B, 38C, namely approximately 36° C. in this example.

The stream 70 is then injected into the first dynamic expansion turbine 34, where it undergoes dynamic expansion to a pressure below 25 bar and especially equal to approximately 17 bar. At the outlet of the expansion turbine 34, the stream 70 forms a first expanded refrigeration stream 72 which constitutes the totality of the first refrigerant stream 60. The stream 60 has a temperature below −22° C. and especially substantially equal to −60° C.

In this example, the flow rate of the first refrigerant stream is substantially equal to 59,960 kmoles/h.

The first refrigerant fluid circulating in the first refrigeration cycle 26 is solely gaseous. Accordingly, it has a liquid content of less than 1% by volume.

In a first embodiment (case 1), that fluid is composed of more than 90 mol % nitrogen, advantageously of 100 mol % nitrogen.

In another variant (case 1a), that fluid is composed of natural gas advantageously comprising more than 70% methane, especially more than 85% methane, and more than 5% $C_2^+$ hydrocarbon. The refrigerant is advantageously formed by feed gas 12.

When carbon dioxide is available in the installation 10, for example by being produced in the installation by decarbonation of the crude natural gas, it is advantageous to introduce at least 10%, advantageously at least 18%, carbon dioxide into the first refrigerant fluid. In a variant (case 1b), the first refrigerant fluid comprises approximately 20% carbon dioxide.

At the outlet of the second heat exchanger 20, the second stream 62 forms a second heated refrigerant stream 76 which is introduced into the second cycle exchanger 44 to form a second stream 78 of refrigerant at low pressure, which is to be introduced into the second compression device 28.

The second heated refrigerant stream 76 is conveyed to the first compression device 32 without passing through either the first heat exchanger 16 or the third heat exchanger 24. It is not placed in a heat exchange relationship again with the natural gas feed between the outlet of the second exchanger 20 and the inlet of the second compression device 40.

The second low-pressure stream 78 then passes, in succession, through each compressor 46A, 46B, 46C and through each cooler 48A, 48B, 48C in order to be compressed to a pressure greater than 40 bar, for example equal to approximately 50 bar, after passing through the compressor 46B, then to a pressure preferably greater than 60 bar, for example substantially equal to 75 bar, after passing through the compressor 46C, which is preferably coupled to the second expansion turbine 42.

At the outlet of the cooler 48C, a second stream 80 of compressed refrigerant is formed.

The stream 80 is cooled in the second cycle exchanger 44 counter-currently to the second heated refrigerant stream 76 to form a second compressed stream 81 cooled to a temperature below −20° C. and especially equal to approximately −37° C.

The stream 81 is then introduced into the second expansion turbine 42 to form a second stream 82 of expanded refrigerant, which in its totality constitutes the second refrigerant stream 62 introduced into the second exchanger 20.

The pressure of the second refrigerant stream 62 at the inlet of the exchanger 20 is less than 32 bar and is especially equal to approximately 27 bar.

The temperature of the second refrigerant stream 62 at the inlet of the exchanger 20 is below −80° C. and is especially equal to −92° C. In this example, the flow rate of the second refrigerant stream 62 is substantially equal to 164,850 kmoles/h.

The second refrigerant fluid circulating in the second refrigeration cycle 28 is also solely gaseous. Accordingly, it has a liquid content of less than 1% by volume.

In a first embodiment, the second refrigerant fluid circulating in the second cycle 28 is formed of more than 90% nitrogen, advantageously of approximately 100% nitrogen.

In a variant, the second refrigerant fluid is formed of natural gas containing more than 70% methane and less than 10% nitrogen.

After passing through the third exchanger 24, the third refrigerant stream 64 forms a third stream 86 of heated refrigerant, which is introduced into the third cycle exchanger 54 to form a third low-pressure heated refrigerant stream 88, at a temperature close to ambient temperature and especially substantially equal to 34° C.

The third heated refrigerant stream 86 is conveyed to the third compression device 50 without passing through either the first heat exchanger 16 or the second heat exchanger 20. It is not placed in a heat exchange relationship again with the natural gas feed between the outlet of the third exchanger 24 and the inlet of the third compression device 50.

The third low-pressure stream 88 is then introduced, in succession, into each compressor 56A, 56B, 56C and into each cooler 58A, 58B, 58C to form, at the outlet of the third compression device 30, a third high-pressure refrigerant stream 90.

The pressure of the stream 90 at the outlet of the compressor 56B is preferably greater than 40 bar. After passage through the compressor 56C, which is preferably coupled to the third expansion turbine 52, that pressure is preferably greater than 50 bar, especially greater than 70 bar.

The third high-pressure stream 90 is then introduced into the third cycle exchanger 54 in order to be cooled counter-currently to the third heated refrigeration stream 86 and form a third compressed stream 91 cooled to a temperature below −60° C. and especially equal to approximately −75° C.

The stream 91 is then introduced into the third expansion turbine 42 to form a third expanded refrigeration stream 92, which constitutes in its totality the third refrigerant stream 64 introduced into the third exchanger 24.

The pressure of the third refrigerant stream 64 at the inlet of the exchanger 24 is less than 20 bar and is especially equal to approximately 13 bar.

The temperature of the third refrigerant stream 64 at the inlet of the exchanger 24 is less than −120° C. and is especially equal to −150° C. In this example, the flow rate of the third refrigerant stream 64 is substantially equal to 79,818 kmoles/h.

In the example shown in FIG. 1, the third refrigerant fluid circulating in the third cycle 30 is substantially gaseous, that is to say it comprises less than 1% by volume liquid.

The molar nitrogen content of the third refrigerant fluid is greater than 90% and is advantageously equal to 100%.

Examples of the temperature, pressure and mass flow rate of the various streams shown in the process of FIG. 1 are summarized in the tables below.

|  |  | Stream | Case 1 | Case 1a |
|---|---|---|---|---|
| Natural gas |  |  |  |  |
| T ° Precooling | ° C. | 18 | −40.00 | −40.00 |
| T ° Liquefaction | ° C. | 22 | −90.00 | −90.00 |
| T ° Subcooling | ° C. | 14 | −148.10 | −148.10 |

-continued

|  |  | Stream | Case 1 | Case 1a |
|---|---|---|---|---|
| Refrigerant cycle 26 |  |  |  |  |
| T ° after expansion | ° C. | 60 | −59.70 | −42.30 |
| Low pressure | bar | 68 | 16.60 | 18.80 |
| High pressure | bar | 70 | 75.00 | 75.00 |
| Flow rate | kmoles/h | 70 | 59,960 | 66,091 |
| Turbine | kW |  | 43,196 | 41,005 |
| Compressor | kW |  | 46,288 | 40,610 |
| Methane content | mol % | 70 | 0.00 | 87.50 |
| Content of C2+ | mol % | 70 | 0.00 | 8.50 |
| Nitrogen content | mol % | 70 | 100.00 | 4.00 |
| Refrigerant cycle 28 |  |  |  |  |
| Precooling | ° C. | 81 | −36.85 | −27.75 |
| T ° C. after expansion | ° C. | 62 | −92.00 | −92.00 |
| Low pressure | bar | 78 | 26.75 | 22.40 |
| High pressure | bar | 80 | 75.00 | 75.00 |
| Flow rate | kmoles/h | 80 | 164,853 | 124,200 |
| Turbine | kW |  | 61,445 | 45,448 |
| Compressor | kW |  | 100,891 | 90,299 |
| Methane content | mol % | 80 | 0.00 | 93.00 |
| Content of $C_2^+$ | mol % | 80 | 0.00 | 0.50 |
| Nitrogen content | mol % | 80 | 100.00 | 6.50 |
| Refrigerant cycle 30 |  |  |  |  |
| Precooling | ° C. | 91 | −74.95 | −74.95 |
| T ° C. after expansion | ° C. | 64 | −150.10 | −150.10 |
| Low pressure | bar | 88 | 12.55 | 12.55 |
| High pressure | bar | 90 | 75.00 | 75.00 |
| Flow rate | kmoles/h | 90 | 79,818 | 79,818 |
| Turbine | kW |  | 34,839 | 34,839 |
| Compressor | kW |  | 107,177 | 107,177 |
| Methane content | mol % | 90 | 0.00 | 0.00 |
| Nitrogen content | mol % | 90 | 100.00 | 100.00 |

The energy consumption of the process, for different types of refrigerant, is shown in Table 2.

|  |  | Case 1 | Case 1a | Case 1b |
|---|---|---|---|---|
| Refrigerant cycle 1 | — | N2 | GN2 | GN2 + CO2 |
| Refrigerant cycle 2 | — | N2 | GN1 | GN1 |
| Refrigerant cycle 3 | — | N2 | N2 | N2 |
| Power cycle 1 | kW | 46,288 | 40,610 | 35,895 |
| Power cycle 2 | kW | 100,891 | 90,299 | 90,299 |
| Power cycle 3 | kW | 107,177 | 107,177 | 107,177 |
| Total power | kW | 254,356 | 238,086 | 233,371 |

As will be seen from these tables, despite the low theoretical energy efficiency of the refrigeration cycles with gas expansion, it is possible, by using at least three refrigeration cycles 26, 28, 30 with dynamic gas expansion arranged in series, to obtain a very satisfactory overall efficiency.

Optimization of the nature of the refrigerant fluids present in each refrigeration cycle 26, 28, 30 permits a further improvement in the efficiency of the cycles of more than 15 MW or even more than 20 MW, depending on the chosen refrigerant content, which is considerable given the fluid flow rates that are being treated.

Figure 2:
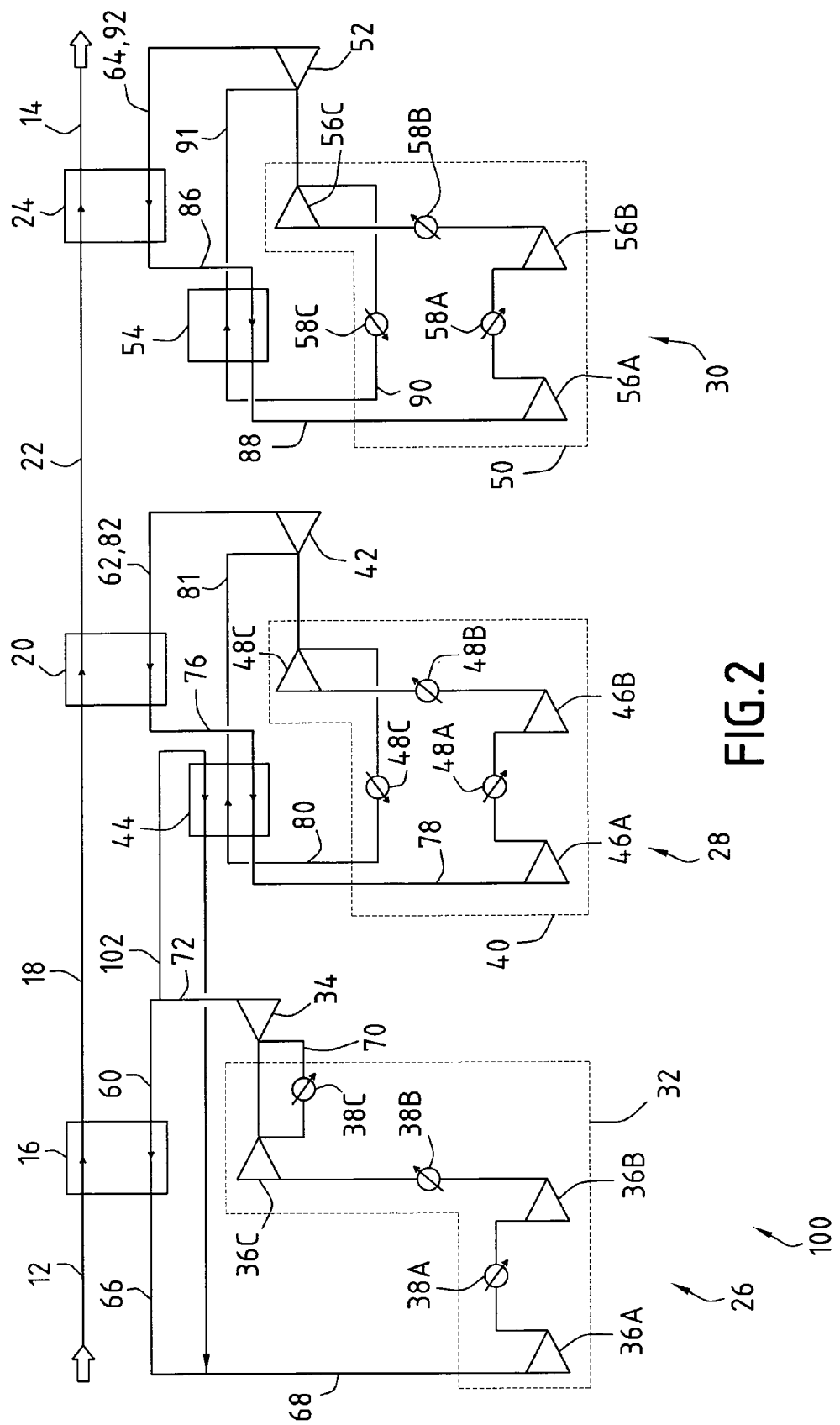
FIG. 2 is a view analogous to FIG. 1 of a second installation for carrying out a second production process according to the invention.

A second installation 100 according to the invention is shown in FIG. 2. The second installation 100 is to carry out a second production process according to the invention.

The second process according to the invention differs from the first process in that the first expanded refrigeration stream 72 issuing from the first dynamic expansion turbine 34 is separated into the first refrigerant stream 60, which is to be conveyed to the first exchanger 16, and a first auxiliary cooling stream 102 of the second refrigeration cycle 28.

The first auxiliary refrigeration stream 102 has a molar flow rate of from 0% to 30% of the molar flow rate of the first expanded refrigeration stream 72.

The first auxiliary refrigeration stream 102 is introduced into the second cycle exchanger 44 of the second refrigeration cycle 28 in order to cool, counter-currently, the second high-pressure refrigerant stream 80 before it passes through the second expansion turbine 42.

At the outlet of the second cycle exchanger 44, the stream 102 is mixed with the first heated refrigerant stream 66 to form the first low-pressure heated stream 68.

In this example, the first refrigerant fluid and the second refrigerant fluid remain completely separate and are not mixed with one another, especially in the second cycle exchanger 44.

Examples of the temperature, pressure and mass flow rate of the various streams shown in the process of FIG. 2 are summarized in the tables below.

|  |  | Stream | Case 2 |
|---|---|---|---|
| Natural gas |  |  |  |
| T Precooling | ° C. | 18 | −40.00 |
| T Liquefaction | ° C. | 22 | −90.00 |
| T Subcooling | ° C. | 14 | −148.10 |
| Refrigerant cycle 26 |  |  |  |
| T ° C. after expansion | ° C. | 72, 60, 102 | −42.30 |
| Low pressure | bar | 68 | 18.80 |
| High pressure | bar | 70 | 75.00 |
| Flow rate | kmoles/h | 70 | 81,091 |
| Turbine | kW |  | 50,312 |
| Compressor | kW |  | 50,232 |
| Methane content | mol % | 70 | 87.50 |
| Content of C2+ | mol % | 70 | 8.50 |
| Nitrogen content | mol % | 70 | 4.00 |
| Refrigerant cycle 28 |  |  |  |
| Precooling | ° C. | 81 | −33.90 |
| T ° C. after expansion | ° C. | 62 | −92.00 |
| Low pressure | bar | 78 | 25.15 |
| High pressure | bar | 80 | 75.00 |
| Flow rate | kmoles/h | 80 | 118,107 |
| Turbine | kW |  | 37,040 |
| Compressor | kW |  | 78,811 |
| Methane content | mol % | 80 | 93.00 |
| Content of C2+ | mol % | 80 | 0.50 |
| Nitrogen content | mol % | 80 | 6.50 |
| Refrigerant cycle 30 |  |  |  |
| Precooling | ° C. | 91 | −74.00 |
| T ° C. after expansion | ° C. | 64 | −150.30 |
| Low pressure | bar | 88 | 12.20 |
| High pressure | bar | 90 | 75.00 |
| Flow rate | kmoles/h | 90 | 78,441 |
| Turbine | kW |  | 34,640 |
| Compressor | kW |  | 107,121 |
| Methane content | mol % | 90 | 3.00 |
| Nitrogen content | mol % | 90 | 97.00 |

As the table below shows, a gain of 1.8 MW is obtained relative to the process of FIG. 1 with a constant refrigerant fluid composition.

|  |  | Process according to FIG. 1 | Process according to FIG. 2 |
|---|---|---|---|
| Power cycle 26 | kW | 40,610 | 50,232 |
| Power cycle 28 | kW | 90,299 | 78,811 |
| Total of the 2 cycles | kW | 130,909 | 129,043 |

Figure 3:
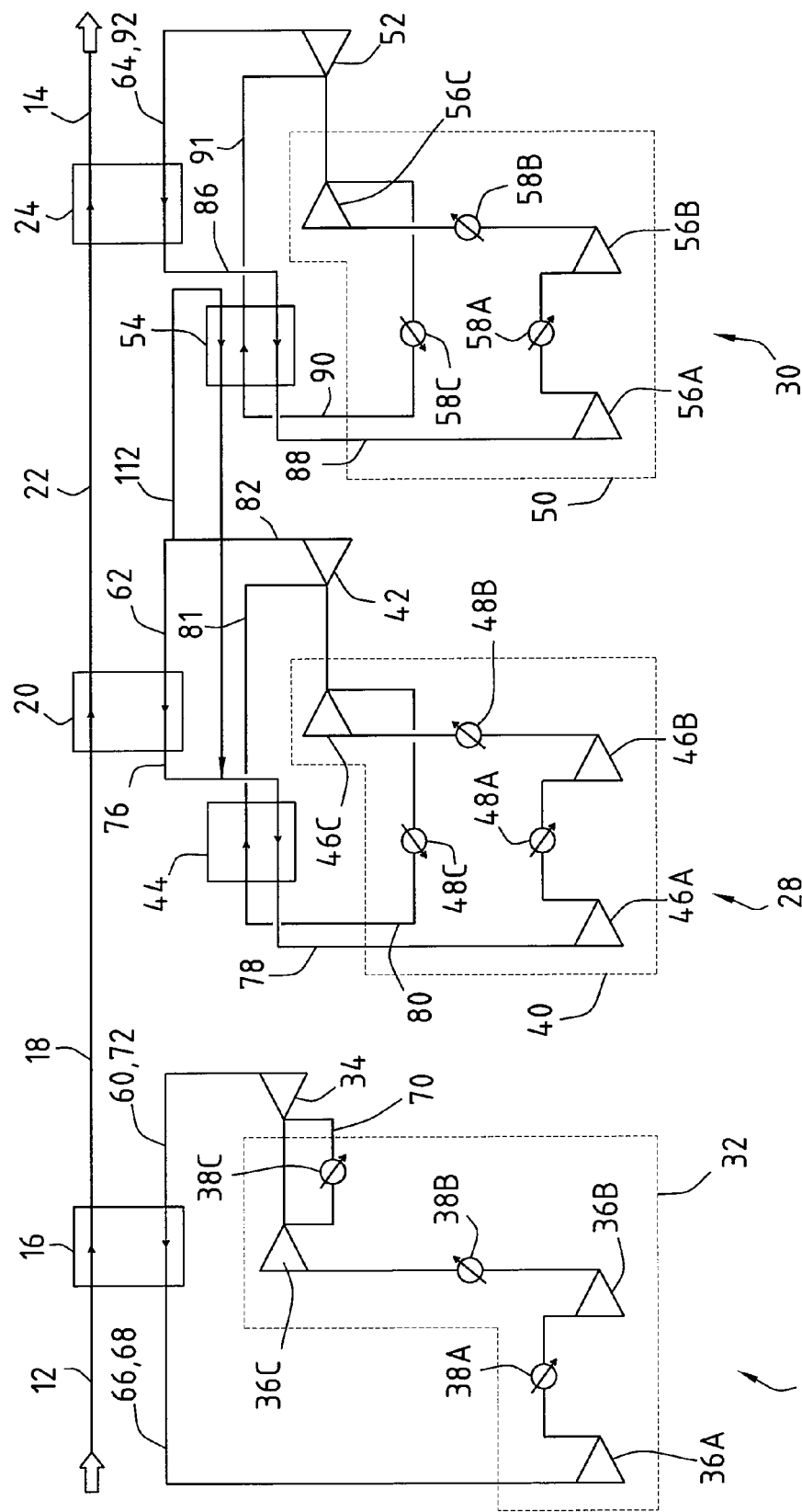
FIG. 3 is a view analogous to FIG. 1 of a third installation for carrying out a third production process according to the invention.

A third installation 110 according to the invention is shown in FIG. 3. The third installation 110 is to carry out a third production process according to the invention.

The third process according to the invention differs from the first process described in FIG. 1 in that the second expanded refrigerant stream 82 is separated into the second refrigeration stream 62, which is to be introduced into the second heat exchanger 20, and a second auxiliary refrigeration stream 112, which is to supply frigories to the third refrigeration cycle 30.

The molar flow rate of the second auxiliary refrigeration stream 112 is 25% less than the molar flow rate of the second expanded refrigeration stream 82 issuing from the second expansion turbine 42.

The second auxiliary refrigeration stream 112 is introduced into the third cycle exchanger 54 in order to cool, counter-currently, the third high-pressure refrigeration stream 90 before it is introduced into the third expansion turbine 52.

After passing through the third exchanger 54, the stream 112 is mixed with the second heated refrigerant stream 76 before being introduced into the second cycle exchanger 44 to form, at the outlet of the exchanger 44, the second low-pressure refrigerant stream 78.

Examples of the temperature, pressure and molar flow rate of the various streams shown in the process of FIG. 3 are summarized in the tables below.

|  |  | Stream | Case 3 |
|---|---|---|---|
| Natural gas |  |  |  |
| T Precooling | ° C. | 18 | −40.00 |
| T Liquefaction | ° C. | 22 | −90.00 |
| T Subcooling | ° C. | 14 | −148.10 |
| Refrigerant cycle 26 |  |  |  |
| T ° C. after expansion | ° C. | 60 | −43.00 |
| Low pressure | bar | 68 | 18.50 |
| High pressure | bar | 70 | 75.00 |
| Flow rate | kmoles/h | 70 | 63,288 |
| Turbine | kW |  | 39,657 |
| Compressor | kW |  | 39,951 |
| Methane content | mol % | 70 | 87.50 |
| Content of $C_2^+$ | mol % | 70 | 8.50 |
| Nitrogen content | mol % | 70 | 4.00 |
| Refrigerant cycle 28 |  |  |  |
| Precooling | ° C. | 81 | −27.65 |
| T ° C. after expansion | ° C. | 62, 82, 112 | −92.00 |
| Low pressure | bar | 78 | 22.35 |
| High pressure | bar | 80 | 75.00 |
| Flow rate | kmoles/h | 80 | 139,232 |
| Turbine | kW |  | 51,081 |
| Compressor | kW |  | 101,456 |
| Methane content | mol % | 80 | 93.00 |
| Content of $C_2^+$ | mol % | 80 | 0.50 |
| Nitrogen content | mol % | 80 | 6.50 |
| Refrigerant cycle 30 |  |  |  |
| Precooling | ° C. | 91 | −83.75 |
| T ° C. after expansion | ° C. | 64 | −150.10 |
| Low pressure | bar | 88 | 15.25 |
| High pressure | bar | 90 | 75.00 |
| Flow rate | kmoles/h | 90 | 74,474 |
| Turbine | kW |  | 26,942 |
| Compressor | kW |  | 89,667 |
| Methane content | mol % | 90 | 3.00 |
| Nitrogen content | mol % | 90 | 97.00 |

The energy consumption is given in the table below. A gain in efficiency of approximately 6.5 MW is obtained by this arrangement.

|  |  | Process according to FIG. 1 | Process according to FIG. 3 |
|---|---|---|---|
| Power cycle 28 | kW | 90,299 | 101,456 |
| Power cycle 30 | kW | 107,121 | 89,667 |
| Total of the 2 cycles | kW | 197,420 | 191,123 |

Figure 4:
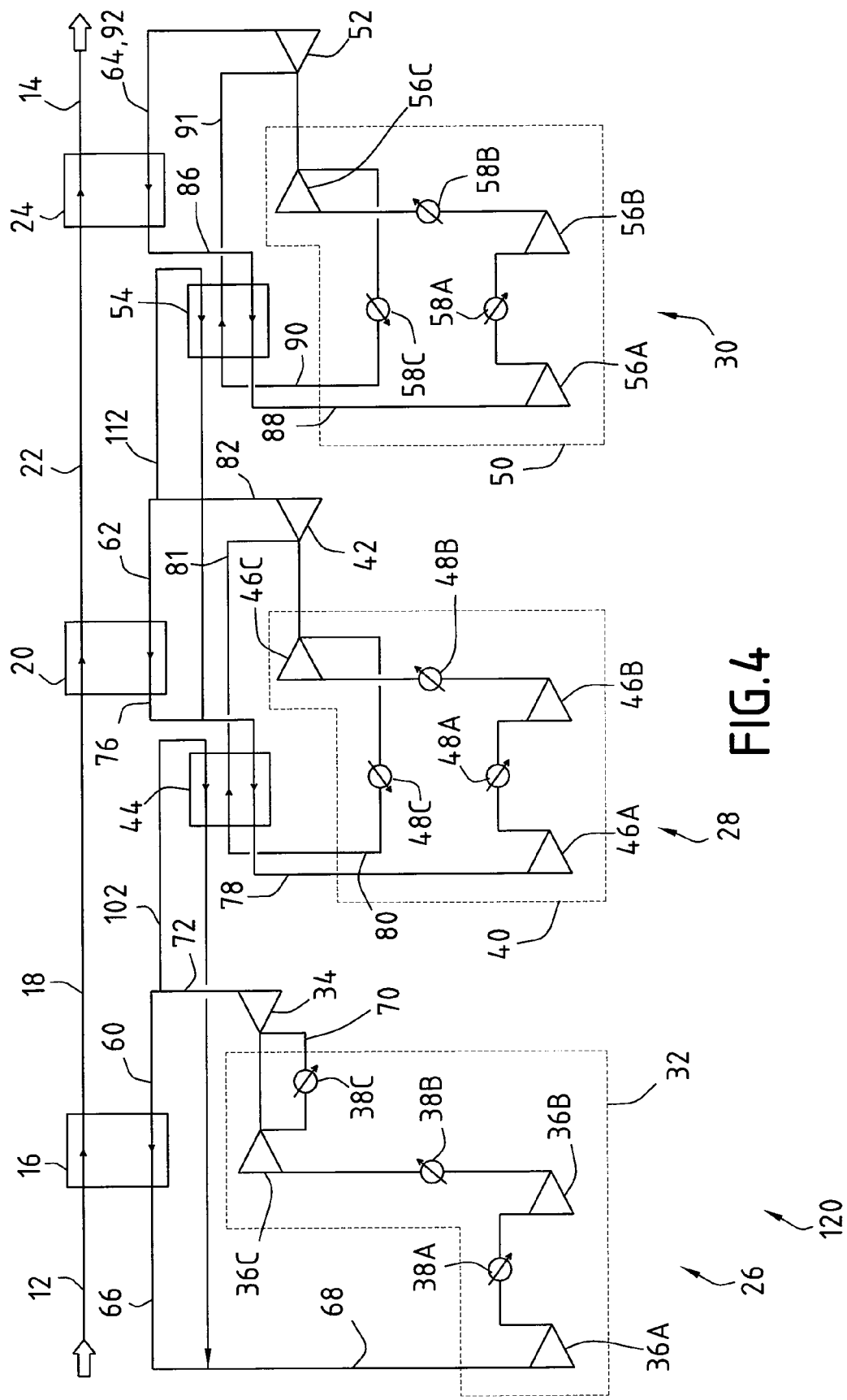
FIG. 4 is a view analogous to FIG. 1 of a fourth installation for carrying out a fourth process according to the invention.

A fourth installation 120 according to the invention is shown in FIG. 4. Unlike in the second installation 100, the second expanded refrigeration stream 82 is divided into the second refrigeration stream 62 and the second auxiliary refrigeration stream 112 of the third cycle 30, as in the embodiment of FIG. 3.

Examples of the temperature, pressure and mass flow rate of the various streams used in the process of FIG. 4 are summarized in the tables below.

|  |  | Stream | Case 4 |
|---|---|---|---|
| Natural gas |  |  |  |
| T Precooling | ° C. | 18 | −40.00 |
| T Liquefaction | ° C. | 22 | −90.00 |
| T Subcooling | ° C. | 14 | −148.10 |
| Refrigerant cycle 26 |  |  |  |
| T ° C. after expansion | ° C. | 60, 72, 102 | −42.30 |
| Low pressure | bar | 68 | 18.80 |
| High pressure | bar | 70 | 75.00 |
| Flow rate | kmoles/h | 70 | 81,091 |
| Turbine | kW |  | 50,312 |
| Compressor | kW |  | 50,237 |
| Methane content | mol % | 70 | 87.50 |
| Content of C$_2^+$ | mol % | 70 | 8.50 |
| Nitrogen content | mol % | 70 | 4.00 |
| Refrigerant cycle 28 |  |  |  |
| Precooling | ° C. | 81 | −33.05 |
| T ° C. after expansion | ° C. | 62, 82, 112 | −92.00 |
| Low pressure | bar | 78 | 24.75 |
| High pressure | bar | 80 | 75.00 |
| Flow rate | kmoles/h | 80 | 133,974 |
| Turbine | kW |  | 42,973 |
| Compressor | kW |  | 90,525 |
| Methane content | mol % | 80 | 93.00 |
| Content of C$_2^+$ | mol % | 80 | 0.50 |
| Nitrogen content | mol % | 80 | 6.50 |
| Refrigerant cycle 30 |  |  |  |
| Precooling | ° C. | 91 | −84.10 |
| T ° C. after expansion | ° C. | 64 | −150.10 |
| Low pressure | bar | 88 | 15.35 |
| High pressure | bar | 90 | 75.00 |
| Flow rate | kmoles/h | 90 | 74,147 |
| Turbine | kW |  | 26,633 |
| Compressor | kW |  | 88,877 |
| Methane content | mol % | 90 | 3.00 |
| Nitrogen content | mol % | 90 | 97.00 |

The energy consumption of this process is approximately 8.5 MW less, relative to the process of FIG. 1.

Figure 5:
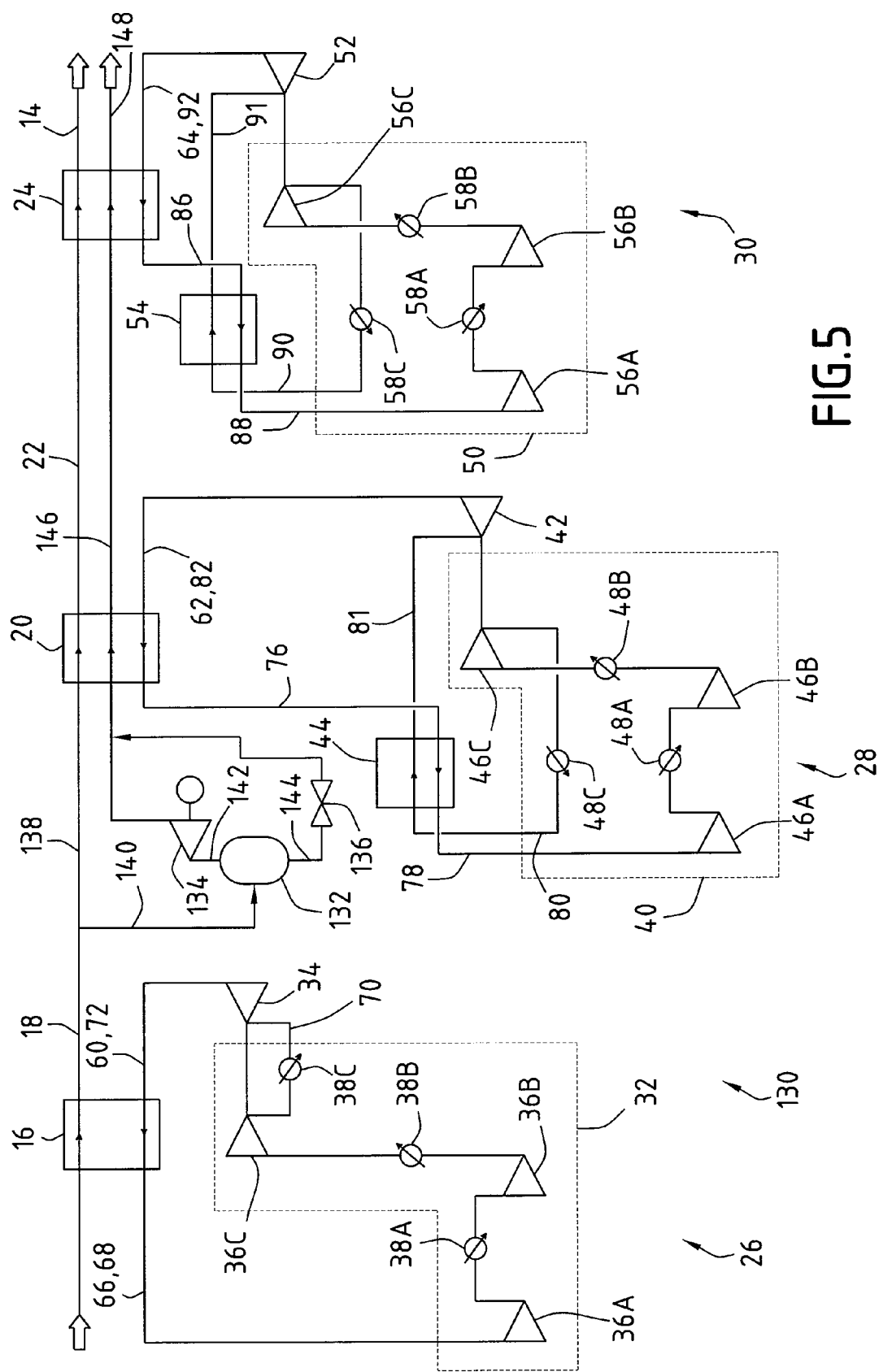
FIG. 5 is a view analogous to FIG. 1 of a fifth installation for carrying out a fifth process according to the invention.

A fifth installation 130 according to the invention is shown in FIG. 5.

The fifth installation 130 according to the invention differs from the first installation 10 in that it comprises a flask 132 for separating part of the precooled feed stream 18, a gas expansion turbine 134, which is connected to an upper portion of the flask 132, and a static expansion valve 136, which is connected to a lower portion of the flask 132.

The fifth process according to the invention differs from the first process according to the invention in that the precooled feed stream 18 is separated at the outlet of the first heat exchanger 16 into a main precooled feed stream 138 and an auxiliary precooled feed stream 140.

The main precooled feed stream 138 is conveyed to the second heat exchanger 20 to form a high-pressure LNG stream 22 and then, after passing through the third exchanger 24, a high-pressure subcooled LNG stream 14 at a pressure greater than 30 bar and especially approximately equal to 62 bar.

The auxiliary precooled feed stream 140 is introduced into the separating flask 132. The vapour fraction 142 issuing from the separation flask 132 is introduced into the gas expansion turbine 134 in order to be expanded to a pressure that is at least 5 bar below the starting pressure and especially substantially equal to 40 bar.

The liquid fraction 144 is introduced into the static expansion valve 136 in order to be expanded to a pressure which is substantially identical with the expansion turbine outlet pressure and especially is substantially equal to 40 bar.

After being expanded, the fractions 144, 142 are combined and then introduced into the second heat exchanger 20. At the outlet of the second exchanger 20 they form an auxiliary low-pressure LNG stream 146 which is cooled in the third heat exchanger 24 to form an auxiliary subcooled LNG stream 148. The temperature of the auxiliary stream 148 is substantially equal to that of the main stream 14.

The process therefore delivers two subcooled LNG streams 14, 148 at distinct pressures that differ by at least 5 bar.

Examples of the temperature, pressure and mass flow rate of the various streams shown in the process of FIG. 5 are summarized in the tables below.

|  |  | Stream | FIG. 5 |
|---|---|---|---|
| Natural gas |  |  |  |
| T Precooling | ° C. | 18 | −40.00 |
| T Liquefaction | ° C. | 22 | −94.00 |
| T Subcooling | ° C. | 14 | −148.10 |
| Refrigerant cycle 26 |  |  |  |
| T ° C. after expansion | ° C. | 60 | −42.30 |
| Low pressure | bar | 68 | 18.80 |
| High pressure | bar | 70 | 75.00 |
| Flow rate | kmoles/h | 70 | 83,141 |
| Turbine | kW |  | 51,584 |
| Compressor | kW |  | 51,499 |
| Methane content | mol % | 70 | 87.50 |
| Content of C2+ | mol % | 70 | 8.50 |
| Nitrogen content | mol % | 70 | 4.00 |
| Refrigerant cycle 28 |  |  |  |
| Precooling | ° C. | 81 | −34.10 |
| T ° C. after expansion | ° C. | 62 | −96.00 |
| Low pressure | bar | 78 | 23.15 |
| High pressure | bar | 80 | 75.00 |
| Flow rate | kmoles/h | 80 | 137,986 |
| Turbine | kW |  | 46,005 |
| Compressor | kW |  | 100,381 |
| Methane content | mol % | 80 | 93.00 |
| Content of C2+ | mol % | 80 | 0.50 |
| Nitrogen content | mol % | 80 | 6.50 |
| Refrigerant cycle 30 |  |  |  |
| Precooling | ° C. | 91 | −92.85 |
| T ° C. after expansion | ° C. | 64 | −150.10 |
| Low pressure | bar | 88 | 18.50 |
| High pressure | bar | 90 | 75.00 |
| Flow rate | kmoles/h | 90 | 69,200 |
| Turbine | kW |  | 20,207 |
| Compressor | kW |  | 74,057 |
| Methane content | mol % | 90 | 3.00 |
| Nitrogen content | mol % | 90 | 97.00 |

The energy consumption of this process is given in the table below. A gain of more than 1 MW is obtained relative to the process of FIG. 4, not including the 600 kW of electricity produced by turbine 134.

|  |  | Process according to FIG. 4 | Process according to FIG. 5 |
|---|---|---|---|
| Power cycle 26 | kW | 50,237 | 46,470 |
| Power cycle 28 | kW | 90,525 | 92,740 |
| Power cycle 30 | kW | 88,877 | 89,310 |
| Total | kW | 229,639 | 228,520 |

Figure 6:
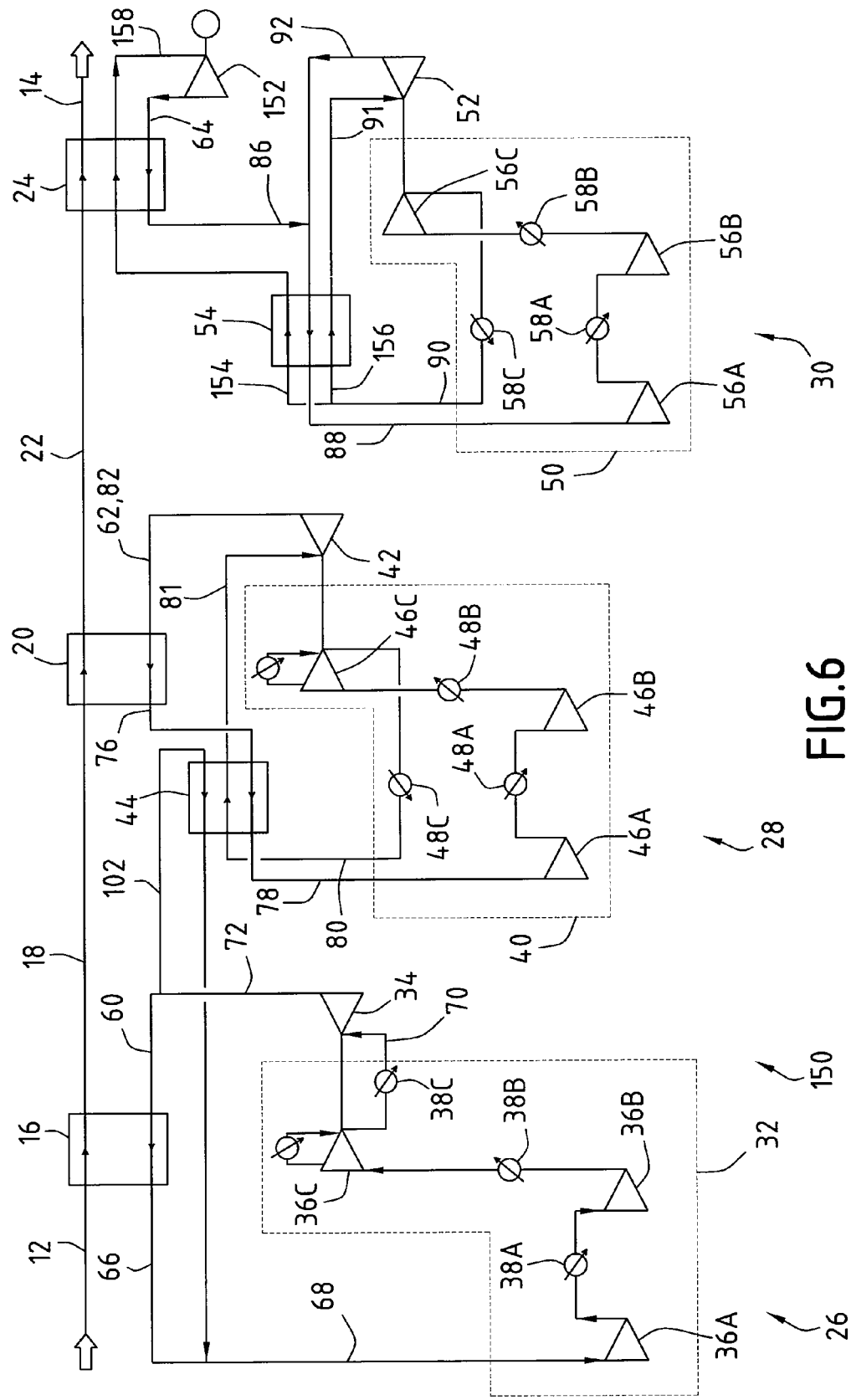
FIG. 6 is a view analogous to FIG. 1 of a sixth installation for carrying out a sixth process according to the invention.

A sixth installation 150 according to the invention is shown in FIG. 6. The sixth installation is to carry out a sixth process according to the invention.

The sixth installation 150 differs from the second installation 100 in that the third refrigeration cycle 30 is a cycle of the "indirect reverse Brayton" type, which comprises a liquid expansion turbine 152.

The sixth process according to the invention differs from the second process according to the invention in that the third compressed refrigerant stream 90 is separated, before passing through the third cycle exchanger 54, into a stream 154 for forming the third refrigerant stream 66 and a gaseous stream 156 for cooling the forming stream 154.

The forming stream 154 forms a molar fraction less than 50% of the compressed refrigerant stream 90.

The stream 154 is introduced into the third cycle exchanger 54 and then into the third heat exchanger 24 in order to liquefy substantially totally and yield a high-pressure liquid refrigerant stream 158.

The volume fraction of liquid in the liquid stream 158 is greater than 99%. The stream 158 is introduced into the liquid expansion turbine 152 at a pressure greater than 50 bar and substantially equal to 73 bar and at a temperature substantially equal to the temperature of the subcooled LNG.

After passing through the liquid expansion turbine 152, the stream 158 forms the third refrigerant stream, the vaporized fraction of which does not exceed 10% by mass.

The stream 64 is placed in a heat exchange relationship with the LNG stream 22 and with the stream 154 issuing from the third cycle exchanger 54 in the third heat exchanger 24.

The third refrigerant stream 64, which is largely liquid, vaporizes substantially completely in the third heat exchanger 24, so that its volume liquid fraction at the outlet of the third heat exchanger 24 is less than 1%, to form the third heated gaseous refrigerant stream 86.

The gaseous stream 156 is introduced into the third cycle exchanger 54 to form the third cooled compressed stream 91 and is then expanded dynamically in the third dynamic expansion turbine 52 to form a gaseous stream 92 of cooled expanded refrigerant.

The temperature of the stream 92 is preferably below −100° C. and is especially equal to −118° C. Its pressure is preferably less than 20 bar and is especially equal to approximately 14 bar.

The streams 66, 92 are mixed together before being introduced into the exchanger 54 in order to cool, countercurrently, the forming stream 154, which is to be liquefied, and the refrigeration stream 156.

At the outlet of the third cycle exchanger 54, the mixture 161 forms the third low-pressure refrigerant stream 88.

Accordingly, the forming stream 154, and consequently the third refrigerant stream 64, are obtained at least partly from the expanded gaseous stream 92 issuing from the dynamic expansion in the third expansion turbine 52.

Furthermore, the frigories required for the liquefaction of the forming stream 154 are for the most part supplied by the expanded gaseous stream 92. A refrigeration cycle of the reverse Brayton type, with a gaseous refrigerant, is formed between the turbine 52, the stream 92, the stream 161, the stream 88, the third compression device 50, the stream 90, the stream 156 and the stream 91.

Examples of the temperature, pressure and mass flow rate of the various streams shown in the process of FIG. 6 are summarized in the tables below.

|  |  | Stream | Case 6 |
|---|---|---|---|
| Natural gas |  |  |  |
| T Precooling | ° C. | 18 | −40.00 |
| T Liquefaction | ° C. | 22 | −110.00 |
| T Subcooling | ° C. | 14 | −148.10 |
| Refrigerant cycle 26 |  |  |  |
| T ° C. after expansion | ° C. | 60 | −45.30 |
| Low pressure | bar | 68 | 17.40 |
| High pressure | bar | 70 | 75.00 |
| Flow rate | kmoles/h | 70 | 96,500 |
| Turbine | kW |  | 62,735 |
| Compressor | kW |  | 62,366 |
| Methane content | mol % | 70 | 87.50 |
| Content of C2+ | mol % | 70 | 8.50 |
| Nitrogen content | mol % | 70 | 4.00 |
| Refrigerant cycle 28 |  |  |  |
| Precooling | ° C. | 81 | −40.00 |
| T ° C. after expansion | ° C. | 62 | −113.10 |
| Low pressure | bar | 78 | 17.60 |
| High pressure | bar | 80 | 75.00 |
| Flow rate | kmoles/h | 80 | 102,000 |
| Turbine | kW |  | 38,693 |
| Compressor | kW |  | 95,067 |
| Methane content | mol % | 80 | 90.00 |
| Content of C2+ | mol % | 80 | 0.00 |
| Nitrogen content | mol % | 80 | 10.00 |
| Refrigerant cycle 30 |  |  |  |
| Precooling | ° C. | 91 | −110.00 |
| T ° C. after expansion | ° C. | 92 | −150.20 |
| T after liquefaction | ° C. | 158 | −148.1 |
| T after liquid expansion | ° C. | 64 | −150.2 |
| Low pressure | bar | 88 | 13.50 |
| High pressure | bar | 90 | 75.00 |
| Flow rate | kmoles/h | 90 | 52,000 |
| Turbine | kW |  | 16,696 |
| Compressor | kW |  | 68,771 |
| Methane content | mol % | 90 | 60.00 |
| Nitrogen content | mol % | 90 | 40.00 |

The energy consumption of this process is 226 MW.

Figure 7:
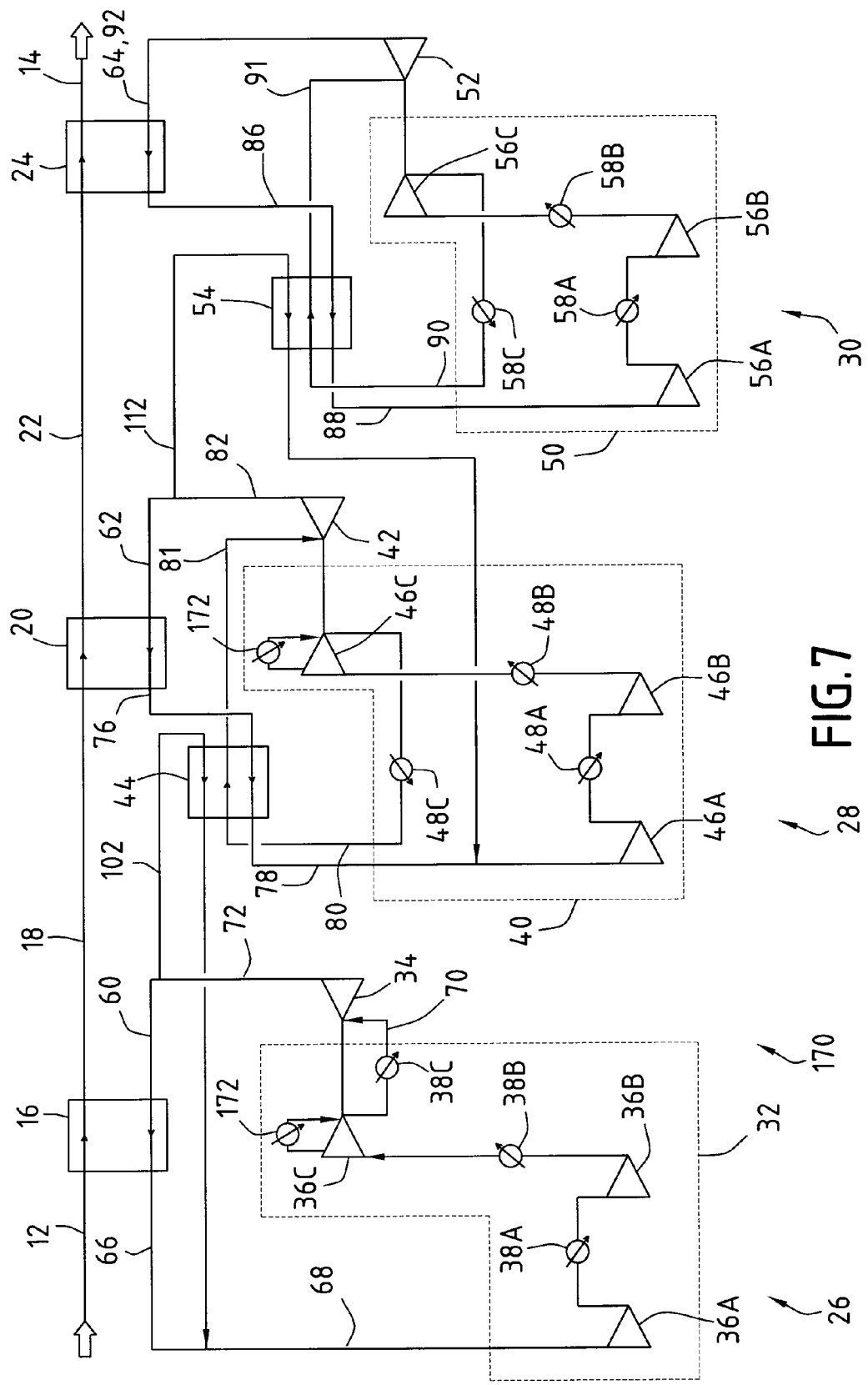
FIG. 7 is a view analogous to FIG. 1 of a seventh installation for carrying out a seventh process according to the invention.

A seventh installation according to the invention 170 is shown in FIG. 7. The installation 170 is to carry out a seventh process according to the invention.

The installation 170 differs from the third installation 110 shown in FIG. 3 in that the compressors 36C, 46C, which are coupled to the first dynamic expansion turbine 34 and the second dynamic expansion turbine 42, respectively, are each formed by two compression stages of the same power, the stages being separated by an intermediate cooler 172 which cools the gas to a temperature which is advantageously below 40° C. and, for example, substantially equal to 36° C.

Furthermore, the seventh process according to the invention differs from the third process according to the invention in that the second auxiliary refrigeration stream 112, after passing through the third cycle exchanger 54, is mixed with the second heated refrigerant stream 76, after that stream 76 has passed through the second cycle exchanger 44. Accordingly, the second auxiliary refrigeration stream 112 does not pass through the second cycle exchanger 44.

Examples of the temperature, pressure and mass flow rate of the various streams shown in the process of FIG. 7 for different temperatures at the outlets of the exchangers 16, 20, 24 are summarized in the table below.

|  |  | Stream | Case 7-1 | Case 7-2 | Case 7-3 |
|---|---|---|---|---|---|
| Natural gas |  |  |  |  |  |
| T Precooling | ° C. | 18 | −40.00 | −35.50 | −31.00 |
| T Liquefaction | ° C. | 22 | −90.00 | −98.50 | −107.00 |
| T Subcooling | ° C. | 14 | −148.10 | −148.10 | −148.10 |
| Refrigerant cycle 26 |  |  |  |  |  |
| T ° C. after expansion | ° C. | 60 | −45.60 | −42.30 | −36.15 |
| Low pressure | bar | 68 | 17.30 | 18.80 | 21.90 |
| High pressure | bar | 70 | 75.00 | 75.00 | 75.00 |
| Flow rate | kmoles/h | 70 | 111,100 | 81,940 | 98,260 |
| Turbine | kW |  | 72,490 | 50,840 | 55,100 |
| Compressor | kW |  | 71,900 | 49,510 | 50,830 |
| Methane content | mol % | 70 | 87.50 | 87.50 | 87.50 |
| Content of C2+ | mol % | 70 | 8.50 | 8.50 | 8.50 |
| Nitrogen content | mol % | 70 | 4.00 | 4.00 | 4.00 |
| Refrigerant cycle 28 |  |  |  |  |  |
| Precooling | ° C. | 81 | −40.00 | −31.00 | −31.00 |
| T ° C. after expansion | ° C. | 62 | −93.10 | −101.00 | −108.00 |
| Low pressure | bar | 78 | 27.50 | 19.50 | 16.50 |
| High pressure | bar | 80 | 75.00 | 75.00 | 75.00 |
| Flow rate | kmoles/h | 80 | 123,700 | 124,400 | 120,200 |
| Turbine | kW |  | 33,320 | 48,260 | 51,410 |
| Compressor | kW |  | 75,900 | 103,200 | 113,700 |
| Methane content | mol % | 80 | 93.00 | 93.00 | 93.00 |
| Content of $C_2^+$ | mol % | 80 | 0.50 | 0.50 | 0.50 |
| Nitrogen content | mol % | 80 | 6.50 | 6.50 | 6.50 |
| Refrigerant cycle 30 |  |  |  |  |  |
| Precooling | ° C. | 91 | −90.00 | −96.00 | −100.00 |
| T ° C. after expansion | ° C. | 64 | −150.20 | −149.7 | −151.60 |
| Low pressure | bar | 88 | 17.40 | 20.00 | 20.50 |
| High pressure | bar | 90 | 75.00 | 75.00 | 75.00 |
| Flow rate | kmoles/h | 90 | 70,370 | 67,200 | 57,300 |
| Turbine | kW |  | 22,080 | 17,920 | 14,120 |
| Compressor | kW |  | 76,390 | 67,020 | 57,020 |
| Methane content | mol % | 90 | 3.00 | 3.00 | 3.00 |
| Nitrogen content | mol % | 90 | 97.00 | 97.00 | 97.00 |

The energy consumption of these processes is given in the table below:

|  |  | Case 7-1 | Case 7-2 | Case 7-3 |
|---|---|---|---|---|
| Total compression | kW | 224,190 | 219,730 | 221,550 |

In a variant (case 7-4), when carbon dioxide is available in the installation 10, for example by being produced in the installation by decarbonation of the crude natural gas, it is advantageous to introduce at least 10%, advantageously at least 18%, carbon dioxide into the first refrigerant fluid. In a variant of case 7-2, the first refrigerant fluid comprises approximately 20% carbon dioxide. The $CO_2$ content must be limited to less than 50 mol % in order to avoid crystallization of the $CO_2$ in the expansion turbine.

The energy consumption of the first cycle 26 of the latter variant is given in the table below in comparison with case 7-2 above. The presence of carbon dioxide improves the efficiency greatly.

| Cycle 26 |  | Case 7-2 | Case 7-4 |
|---|---|---|---|
| N2 content of refrigerant 1 | mol % | 4.0 | 3.2 |
| C1 content of refrigerant 1 | mol % | 87.5 | 70 |

-continued

| Cycle 26 |  | Case 7-2 | Case 7-4 |
|---|---|---|---|
| C2+ content of refrigerant 1 | mol % | 8.5 | 6.8 |
| $CO_2$ content of refrigerant 1 | mol % | 0.0 | 20 |
| Power of compressors K1 and K2 | kW | 50,840 | 46,610 |

Figure 8:
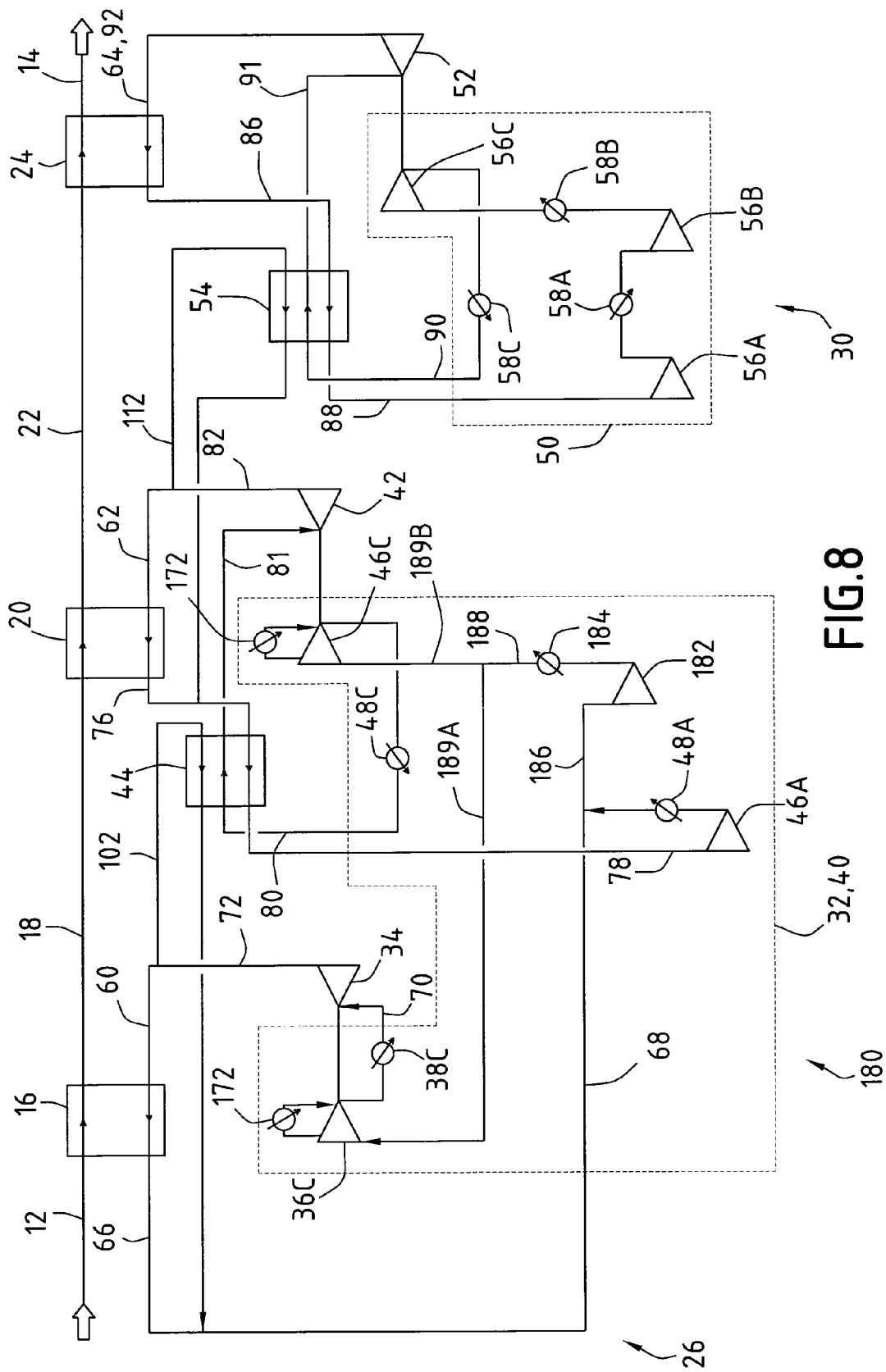
FIG. 8 is a view analogous to FIG. 1 of an eighth installation for carrying out an eighth process according to the invention.

An eighth installation according to the invention 180 is shown in FIG. 8. The eighth installation is to carry out an eighth process according to the invention.

The installation 180 differs from the third installation 110 in that at least one first compressor 182 is common to the first compression device 32 and to the second compression device 40 in order simultaneously to compress the first refrigerant fluid circulating in the first refrigeration cycle 26 and the second refrigerant fluid circulating in the second refrigeration cycle 28, the fluids being mixed before they pass through the first common compressor 182.

The installation 180 further comprises a common cooler 184 located at the outlet of the common compressor 182.

The first compression device 32 accordingly comprises the compressor 182 common to the two devices 32, 40 and the compressor 36C coupled to the first expansion turbine 34.

The second compression device 40 comprises, upstream of the common compressor 182, a compressor 46A and, downstream of the common compressor 182, the compressor 46C, which is preferably coupled to the second expansion turbine 42.

In the eighth process, the second low-pressure stream 78 issuing from the second cycle exchanger 44 is introduced into the first compressor 46A of the second compression device 40.

At the outlet of the compressor 46A, the stream 78 is mixed with the first low-pressure stream 68 to form a mixed stream 186 having an intermediate pressure greater than 20 bar and less than 30 bar.

The mixed stream of intermediate pressure 186 is then introduced into the common compressor 182 to form a medium-pressure mixed stream 188, after passing through the common cooler 184.

The stream 188 has a pressure greater than 35 bar and less than 50 bar.

The stream 188 is then divided into a first intermediate refrigerant stream 189A, which is conveyed to the compressor 36C, which is preferably coupled to the first expansion turbine 34, to form the first compressed refrigerant stream 70, and a second intermediate refrigerant stream 189B, which is introduced into the compressor 46C of the second compression device 40, which is preferably coupled to the second expansion turbine 42, to form the second compressed refrigerant stream 82.

Examples of the temperature, pressure and molar flow rate of the various streams shown in the process of FIG. 8 are summarized in the tables below.

|  |  | Stream | Case 8 |
|---|---|---|---|
| Natural gas |  |  |  |
| T Precooling | ° C. | 18 | −30.00 |
| T Liquefaction | ° C. | 22 | −120.00 |
| T Subcooling | ° C. | 14 | −148.10 |
| Refrigerant cycle 26 |  |  |  |
| T ° C. after expansion | ° C. | 60 | −35.00 |
| Low pressure | bar | 68 | 24.00 |
| High pressure | bar | 70 | 76.50 |
| Flow rate | kmoles/h | 70 | 98,000 |
| Turbine | kW |  | 53,726 |
| Methane content | mol % | 70 | 90.00 |
| Content of C2+ | mol % | 70 | 0.00 |
| Nitrogen content | mol % | 70 | 10.00 |
| Refrigerant cycle 28 |  |  |  |
| Precooling | ° C. | 81 | −30.50 |
| T ° C. after expansion | ° C. | 62 | −123.20 |
| Low pressure | bar | 78 | 11.00 |
| High pressure | bar | 80 | 75.00 |
| Flow rate | kmoles/h | 80 | 108,000 |
| Turbine | kW |  | 57,275 |
| Compressors cycles 26 + 28 | kW |  | 183,545 |
| Methane content | mol % | 80 | 90.00 |
| Content of $C_2^+$ | mol % | 80 | 0.00 |
| Nitrogen content | mol % | 80 | 10.00 |
| Refrigerant cycle 30 |  |  |  |
| Precooling | ° C. | 91 | −98.60 |
| T ° C. after expansion | ° C. | 64 | −163.10 |
| Low pressure | bar | 88 | 14.00 |
| High pressure | bar | 90 | 75.00 |
| Flow rate | kmoles/h | 90 | 42,000 |
| Turbine | kW |  | 13,198 |
| Compressor | kW |  | 56,818 |
| Methane content | mol % | 90 | 0.00 |
| Nitrogen content | mol % | 90 | 100.00 |

This process and the corresponding installation 180 are particularly compact.

Figure 9:
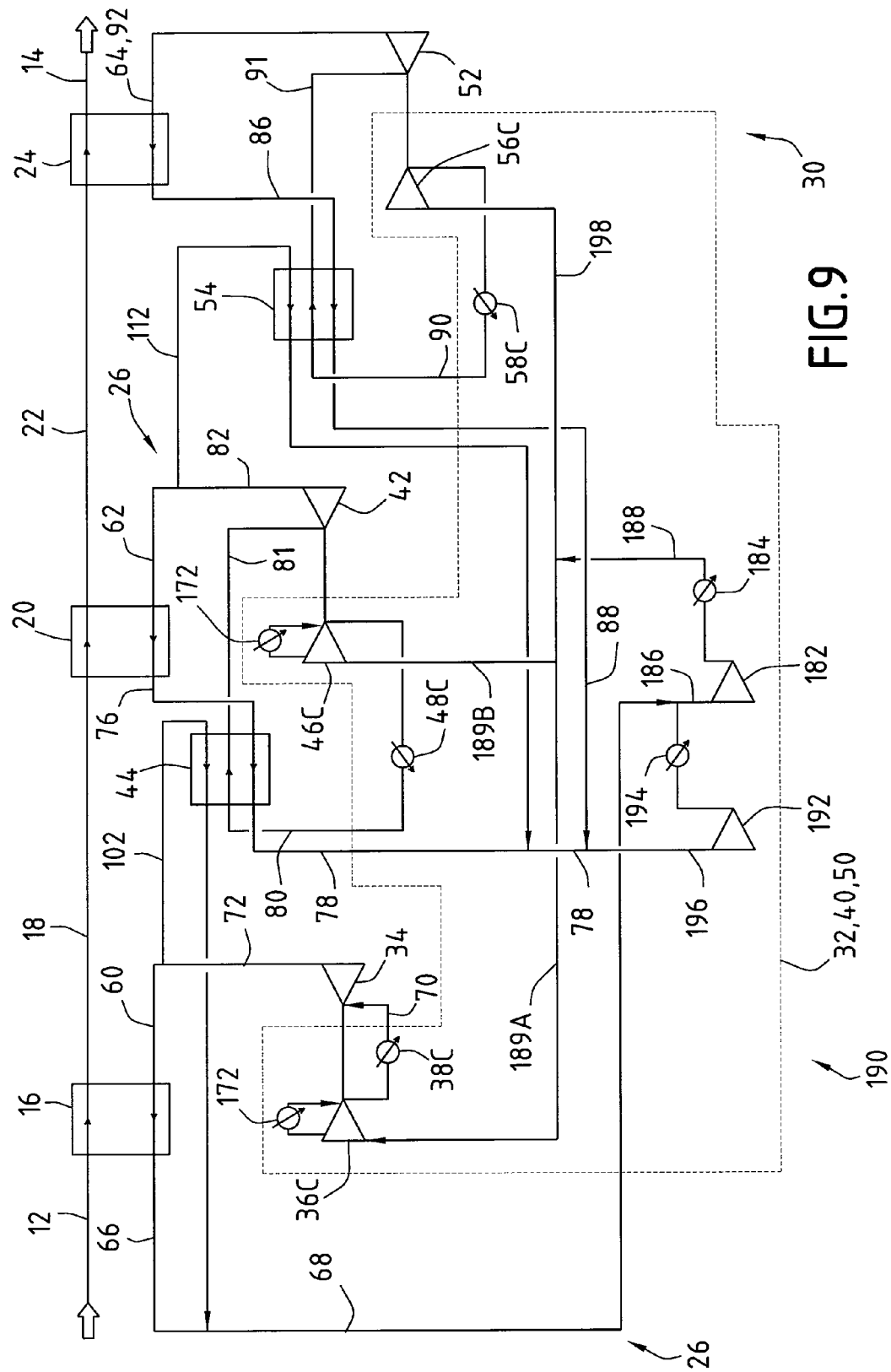
FIG. 9 is a view analogous to FIG. 1 of a ninth installation for carrying out a ninth process according to the invention.

A ninth installation 190 according to the invention is shown in FIG. 9. The installation 190 is to carry out a ninth process according to the invention.

Unlike in the eighth installation 180, the first compressor 182 common to the first compression device 32 and the second compression device 40 is also common to the third compression device 50.

Furthermore, the low-pressure compressor 192 of the second compression device 40 is common to the third compression device 50. The low-pressure cooler 194 located at the outlet of the compressor 192 is also common to the second compression device 40 and to the third compression device 50.

Accordingly, the third compression device 50 comprises, in succession, the low-pressure compressor 192, which is common to the second compression device 40 and to the third compression device 50, the compressor 182, which is common to the three compression devices 32, 40, 50, and the compressor 56C, which is preferably coupled to the third expansion turbine 52.

In the ninth process according to the invention, the second low-pressure refrigerant stream 78 and the third low-pressure refrigerant stream 88, issuing from the second cycle exchanger 44 and the third cycle exchanger 54, respectively, are mixed together to form a mixed low-pressure stream 196.

The mixed low-pressure stream 196 is introduced into the compressor 192, which is common to the second device 40 and to the third device 50, and then into the common cooler 194.

It is then mixed with the first low-pressure refrigerant stream 68 to form the mixed stream 168, which is introduced into the first common compressor 182.

The medium-pressure mixed stream 188 issuing from the common cooler 184 is then divided into the first intermediate stream 189A, the second intermediate stream 189B and a third intermediate stream 198, which is introduced into the compressor 56C, which is preferably coupled to the third expansion turbine 52, to form the third compressed refrigeration stream 90.

Examples of the temperature, pressure and molar flow rate of the various streams shown in the process of FIG. 9 are summarized in the tables below.

|  |  | Stream | Case 9 |
|---|---|---|---|
| Natural gas |  |  |  |
| T Precooling | ° C. | 18 | −31.00 |
| T Liquefaction | ° C. | 22 | −107.00 |
| T Subcooling | ° C. | 14 | −148.10 |
| Refrigerant cycle 26 |  |  |  |
| T ° C. after expansion | ° C. | 60 | −36.60 |
| Low pressure | bar | 68 | 25.20 |
| High pressure | bar | 70 | 74.10 |
| Flow rate | kmoles/h | 70 | 96,000 |
| Turbine | kW |  | 52,750 |
| Compressor | kW |  | — |
| Methane content | mol % | 70 | 000 |
| Content of C2+ | mol % | 70 | 0.00 |
| Nitrogen content | mol % | 70 | 100.00 |
| Refrigerant cycle 28 |  |  |  |
| Precooling | ° C. | 81 | −30.00 |
| T ° C. after expansion | ° C. | 62 | −109.50 |
| Low pressure | bar | 78 | 15.60 |

|  |  | Stream | Case 9 |
|---|---|---|---|
| High pressure | bar | 80 | 73.70 |
| Flow rate | kmoles/h | 80 | 155,500 |
| Turbine | kW |  | 84,538 |
| Compressor | kW |  | — |
| Methane content | mol % | 80 | 0.00 |
| Content of C2+ | mol % | 80 | 0.00 |
| Nitrogen content | mol % | 80 | 100.00 |
| Refrigerant cycle 30 |  |  |  |
| Precooling | ° C. | 91 | −105.00 |
| T ° C. after expansion | ° C. | 64 | −153.40 |
| Low pressure | bar | 88 | 15.60 |
| High pressure | bar | 90 | 54.20 |
| Flow rate | kmoles/h | 90 | 61,500 |
| Turbine | kW |  | 15,615 |
| Compressors cycles 26 + 28 + 30 | kW |  | 252,952 |
| Methane content | mol % | 90 | 0.00 |
| Nitrogen content | mol % | 90 | 100.00 |

Likewise, the arrangement described in the fifth installation 130, according to which the precooled feed stream 18 is separated in order to be introduced partly into a flask 132, can be arranged in any of the installations 10, 100, 110, 120, 150, 170, 180, 190 described hereinbefore.

The installations according to the invention described above are arranged on land or, advantageously, on a floating structure or on a fixed structure on the surface of an expanse of water, such as a platform or a floating unit for the recovery, storage and treatment of hydrocarbons designated by the acronym "FPSO".

The heat exchangers 16, 20, 22, in which there circulate the feed stream 12, the precooled feed stream 18, the liquefied natural gas stream 22 and the subcooled LNG stream 14, in the installations 10, 100, 110, 120, 130, 150, 170, 180 and 190 are preferably tube and calender exchangers having straight tube sections (conventional type) or sections wound in a helix (coiled type). Natural gas streams which may contain impurities capable of affecting the correct operation or the mechanical integrity of the exchangers pass through the exchangers. Tube and calender exchangers are more robust than plate exchangers and increase the reliability of the installation and its safety for producing such exchangers. For producing such exchangers, austenitic stainless steel, for example ASTM 304, is preferred to aluminium-based alloys.

In the installations 10, 100, 110, 120, 170, 180 and 190, in which the above-mentioned exchangers contain only two fluids, the exchangers are tube and calender exchangers of the conventional type, made of austenitic stainless steel of the ASTM 304 type, manufactured according to the standards published by the body Thermal Exchanger Manufacturing Association or "TEMA".

The invention claimed is:

1. A process for the production of a subcooled liquefied natural gas stream from a natural gas feed stream, the method comprising the following steps:
   precooling the natural gas feed stream by passing the natural gas feed stream through a first heat exchanger for obtaining a feed stream precooled to a temperature below −20° C.;
   liquefying the precooled feed stream by passing the precooled feed stream through a second heat exchanger for obtaining at least one liquefied natural gas stream at a temperature below −80° C.;
   subcooling the liquefied natural gas stream by passing the liquefied natural gas stream through a third heat exchanger for obtaining a liquefied natural gas stream subcooled to a temperature below −120° C.;
   during the precooling, placing the natural gas feed stream in a heat exchange relationship in the first heat exchanger with a first stream of substantially gaseous refrigerant and producing the substantially gaseous refrigerant in a first refrigeration cycle from a first gaseous stream of expanded refrigerant fluid issuing from a first dynamic gas expansion turbine;
   during the liquefying, placing the precooled feed stream in a heat exchange relationship in the second heat exchanger with a second stream of gaseous refrigerant circulating in a second refrigeration cycle, producing the second gaseous refrigerant stream from a second gaseous stream of expanded fluid issuing from a second dynamic gas expansion turbine separate from the first dynamic gas expansion turbine;
   during the subcooling, placing the liquefied natural gas stream in a heat exchange relationship in the third heat exchanger with a third refrigerant stream circulating in a third refrigeration cycle, producing the third refrigerant stream at least partly from a third gaseous stream of expanded fluid issuing from a third dynamic expansion turbine separate from the first and the second dynamic gas expansion turbines;
   conveying a first stream of heated refrigerant obtained at an outlet of the first heat exchanger to a first compression device without passing the first stream of heated refrigerant through the second or the third heat exchangers;
   conveying a second stream of heated refrigerant issuing from the second heat exchanger to a second compression device without passing the second stream of heated refrigerant through the first or the third heat exchangers; and
   conveying a third stream of heated refrigerant issuing from the third heat exchanger to a third compression device without passing the third stream of heated refrigerant through the first or the second heat exchangers.

2. The process according to claim 1, further comprising:
   separating the first gaseous stream of expanded refrigerant fluid into a first gaseous refrigerant stream and a first auxiliary cooling stream;
   placing the first auxiliary cooling stream in a heat exchange relationship in a second cycle thermal exchanger with compressed refrigerant stream issuing from the second compression device for forming a second cooled compressed refrigerant stream,
   conveying the second cooled compressed refrigerant stream to the second expansion turbine for forming the second gaseous stream of expanded refrigerant fluid,
   wherein the first auxiliary stream is a gaseous stream.

3. The process according to claim 2, further comprising:
   separating the second gaseous stream of expanded refrigerant fluid into the second gaseous refrigerant stream and a second auxiliary cooling stream, and
   placing the second auxiliary cooling stream in a heat exchange relationship in a third cycle exchanger with compressed refrigerant issuing from the third compression device for forming a third cooled compressed refrigerant stream, and
   conveying the third cooled compressed refrigerant stream to the third expansion turbine for forming the third gaseous stream of expanded refrigerant fluid.

4. The process according to claim 1, wherein the refrigerant streams comprise respective refrigerant fluids circulating in the first refrigeration cycle, in the second refrigeration cycle and in the third refrigeration cycle and the fluids are kept completely separate, the first heated refrigerant stream issuing from the first heat exchanger, the second heated refrigerant stream issuing from the second heat exchanger, and the third heated refrigerant stream issuing from the third heat exchanger being respectively conveyed to respectively separate compressors of the respective ones of first compression device, the second compression device and the third compression device, respectively for compressing each of the refrigerant streams separately from one another.

5. The process according to claim 1, further comprising:
forming at least one mixed stream from at least two of the first heated refrigerant stream, the second heated refrigerant stream and the third heated refrigerant stream,
compressing each mixed stream in a compressor common to at least two of the first, second and third compression devices.

6. The process according to 1, wherein the third refrigerant stream is substantially gaseous before being introduced into the third heat exchanger.

7. The process according to claim 1, further comprising:
separating the compressed refrigerant stream issuing from the third compression device into a forming stream for forming the third refrigerant stream and into a gaseous cooling stream for refrigeration of the forming stream,
conveying the gaseous cooling stream to the third expansion turbine, and placing the expanded gaseous cooling stream issuing from the third expansion turbine in a heat exchange relationship with the forming stream for liquefying the forming stream,
conveying the liquefied forming stream to a hydraulic expansion turbine for forming the third refrigerant stream in substantially liquid form, and
placing the third refrigerant stream in substantially liquid form in a heat exchange relationship with the liquefied natural gas stream in the third heat exchanger.

8. Process according to claim 1, further comprising:
dividing the precooled feed stream issuing from the first heat exchanger into a main precooled feed stream and an auxiliary expansion stream,
expanding the auxiliary expansion stream to a low pressure that is at least 5 bar below the pressure of the main precooled feed stream, and
passing the stream derived from the auxiliary expansion stream through the second heat exchanger and through the third heat exchanger in succession for delivering a stream of subcooled liquefied natural gas at low pressure.

9. The process according to claim 1, wherein a molar nitrogen content of each of the first, second and third refrigerant streams is greater than 90%.

10. The process according to claim 1, wherein the first refrigerant stream is based on natural gas having a molar methane content greater than 70%.

11. The process according to claim 10, wherein the second refrigerant stream has a molar methane content greater than 90%.

12. The process according to claim 10, wherein the first refrigerant stream has a molar carbon dioxide content greater than 5%.

13. The process according to claim 1, wherein a pressure at an outlet of the first compression device is greater than 50 bar, and a pressure at an inlet of the first compression device is greater than 10 bar.

14. The process according to claim 1, wherein each of the first, second and third heat exchangers contains only two fluids.

15. The process according to claim 1, further comprising forming a second stream of compressed refrigerant at an outlet of the second compression device, cooling the second stream of compressed refrigerant and introducing the cooled second stream of compressed refrigerant into the second expansion turbine without passing through either the first heat or the third heat exchanger.

16. An installation for the production of a subcooled liquefied natural gas stream from a natural gas feed stream the installation comprising:
a precooling device for precooling the natural gas feed stream, comprising a first heat exchanger for obtaining a precooled feed stream precooled to a temperature below −20° C.;
a liquefying device for liquefying the precooled feed stream, comprising a second heat exchanger for obtaining at least one liquefied natural gas stream at a temperature below −80° C.;
a subcooling device for subcooling the liquefied natural gas stream, comprising a third heat exchanger for obtaining a liquefied natural gas stream subcooled to a temperature below −120° C.;
a first refrigeration cycle comprising a first dynamic gas expansion turbine and a first compression device, the first refrigeration cycle configured such that the feed stream is placed in a heat exchange relationship in the first heat exchanger with a first stream of substantially gaseous refrigerant produced in the first refrigeration cycle from a first gaseous stream of expanded refrigerant fluid issuing from the first dynamic gas expansion turbine;
a second refrigeration cycle comprising a second dynamic gas expansion turbine, separate from the first dynamic gas expansion turbine, and a second compression device, the second refrigeration cycle configured such that the precooled feed stream is placed in a heat exchange relationship in the second heat exchanger with a second stream of gaseous refrigerant produced from a second gaseous stream of expanded refrigerant fluid coming from the second dynamic gas expansion turbine;
a third refrigeration cycle comprising a third dynamic expansion turbine, separate from the first and the second dynamic gas expansion turbines, and a third compression device, the third refrigeration cycle configured such that the liquefied natural gas stream is placed in a heat exchange relationship in the third heat exchanger with a third refrigerant stream circulating in the third refrigeration cycle, the third refrigerant stream being produced at least partly from a third gaseous stream of expanded fluid issuing from the third dynamic expansion turbine;
the first refrigeration cycle comprising a first conveying device for conveying a first heated refrigerant stream obtained at the outlet of the first heat exchanger to the first compression device without passing through the second heat exchanger and without passing through the third heat exchanger;
the second refrigeration cycle comprising a second conveying device for conveying a second heated refrigerant stream obtained at the outlet of the second heat exchanger to the second compression device without passing through the first heat exchanger and without passing through the third heat exchanger;

the third refrigeration cycle comprising a third conveying device for conveying a third heated refrigerant stream issuing from the third heat exchanger to the third compression device without passing through the first heat exchanger and without passing through the second heat exchanger.

17. The installation according to claim 16, wherein each the first, second and third heat exchangers is a tube and calender exchanger of the conventional or coiled type.

18. The installation according to claim 17, wherein each of the first, second and third heat exchangers is made of austenitic stainless steel.

19. The installation according to claim 16, wherein each of the first, second and third heat exchangers contains only two fluids.

20. A process for the production of a subcooled liquefied natural gas stream from a natural gas feed stream, the method comprising the following steps:
- precooling the natural gas feed stream by passing the natural gas feed stream through a first heat exchanger for obtaining a feed stream precooled to a temperature below −20° C.;
- liquefying the precooled feed stream by passing the precooled feed stream through a second heat exchanger for obtaining at least one liquefied natural gas stream at a temperature below −80° C.;
- subcooling the liquefied natural gas stream by passing the liquefied natural gas stream through a third heat exchanger for obtaining a liquefied natural gas stream subcooled to a temperature below −120° C.;
- during the precooling, placing the natural gas feed stream in a heat exchange relationship in the first heat exchanger with a first stream of substantially gaseous refrigerant and producing the substantially gaseous refrigerant in a first refrigeration cycle from a first gaseous stream of expanded refrigerant fluid issuing from a first dynamic expansion turbine;
- during the liquefying, placing the precooled feed stream in a heat exchange relationship in the second heat exchanger with a second stream of gaseous refrigerant circulating in a second refrigeration cycle, producing the second gaseous refrigerant stream from a second gaseous stream of expanded fluid issuing from a second dynamic expansion turbine separate from the first dynamic expansion turbine;
- during the subcooling, placing the liquefied natural gas stream in a heat exchange relationship in the third heat exchanger with a third refrigerant stream circulating in a third refrigeration cycle, producing the third refrigerant stream at least partly from a third gaseous stream of expanded fluid issuing from a third dynamic expansion turbine separate from the first and the second dynamic expansion turbines;
- conveying a first stream of heated refrigerant obtained at an outlet of the first heat exchanger to a first compression device without passing the first stream of heated refrigerant through the second or the third heat exchangers;
- conveying a second stream of heated refrigerant issuing from the second heat exchanger to a second compression device without passing the second stream of heated refrigerant through the first or the third heat exchangers; and
- conveying a third stream of heated refrigerant issuing from the third heat exchanger to a third compression device without passing the third stream of heated refrigerant through the first or the second heat exchangers; wherein the first stream of gaseous refrigerant, the second stream of gaseous refrigerant and the third stream of gaseous refrigerant comprise nitrogen.

21. The process according to claim 2, wherein the first auxiliary cooling stream is introduced into the second cycle thermal exchanger in which also circulates the compressed refrigerant stream issuing from the second compression device.

* * * * *